United States Patent

[11] 3,534,755

| [72] | Inventor | Thomas F. Urbanosky<br>Cincinnati, Ohio |
|---|---|---|
| [21] | Appl. No. | 752,098 |
| [22] | Filed | July 18, 1968<br>continuation-in-part of Ser. No. 575,092,<br>Aug. 25, 1966, abandoned. |
| [45] | Patented | Oct. 20, 1970 |
| [73] | Assignee | General Electric Company<br>a corporation of New York |

[54] HIGH SIGNAL-TO-NOISE FLUID AMPLIFIER AND FLUIDIC COMPONENTS
74 Claims, 33 Drawing Figs.

[52] U.S. Cl. ..................................................... 137/81.5
[51] Int. Cl. ......................................................... F15c 5/00,
F15c 4/00
[50] Field of Search ............................................ 137/81.5,
15, 271; 235/201(p.f..sens..gen..m.e..etc.).
200 (anal. p.f.. gen.. etc.)

[56] References Cited
UNITED STATES PATENTS

| 2,947,320 | 8/1960 | Oxley et al. | 137/271 |
|---|---|---|---|
| 3,057,551 | 10/1962 | Etter | 235/201m.e. |
| 3,229,705 | 1/1966 | Norwood | 137/81.5 |
| 3,283,767 | 11/1966 | Wright | 137/81.5 |
| 3,294,103 | 12/1966 | Bowles | 137/81.5 |
| 3,314,294 | 4/1967 | Colston | 137/81.5X |
| 3,319,659 | 5/1967 | Bauer | 137/81.5X |
| 3,331,379 | 7/1967 | Bowles | 137/81.5 |
| 3,362,421 | 1/1968 | Schaffer | 137/81.5 |
| 3,390,691 | 7/1968 | Jones | 137/81.5 |
| 3,442,280 | 5/1969 | Boothe | 137/81.5 |
| 2,840,096 | 6/1958 | DuBois | 137/86 |
| 2,850,038 | 9/1958 | Shabaker | 137/505.13 |
| 3,148,703 | 9/1964 | Kachline | 137/608 |
| 3,150,686 | 9/1964 | Kachline | 137/608 |
| 3,267,946 | 8/1966 | Adams et al. | 137/81.5 |
| 3,398,759 | 8/1968 | Rose | 137/81.5 |
| 3,461,833 | 8/1969 | Boyadjieff | 137/81.5X |

OTHER REFERENCES
" Modular Pneumatic Package" , I.B.M. Tech. Disclosure Bull. Langley et al., Vol. 6, No. 5, pp. 3, 4. Oct., 1963. (copy in Scien. Lib. & Gp. 362; 137– 81.5)

*Primary Examiner*—Samuel Scott
*Attorneys*—Paul A. Frank, Louis A. Moucha, John F. Ahern and Frank L. Neuhauser ABSTRACT: An analog-type fluid amplifier having a high signal-to-noise ratio is provided by a slight roughness on the upper or lower walls forming the fluid flow passages. The noise reduction is also obtained by reducing the size of the flow passages. Passage size reduction is obtained by fabricating a fluid amplifier element in a thin lamina and paralleling several separated elements in a stacked laminated structure to obtain the desired flow capacity rating. Each lamina may include several serially connected fluid amplifier elements which are stacked with a laminated supply pressure manifold to form a fluidic "gain block" component. The gain block may be stacked with various other laminae providing fluid input resistors, feedback resistors, and with fluid flow reactive elements to form fluidic operational amplifiers, integrators, and other frequency responsive circuits, all having no moving mechanical parts.

Patented Oct. 20, 1970

Inventor:
Thomas F. Urbanosky,
by Louis A. Moucha

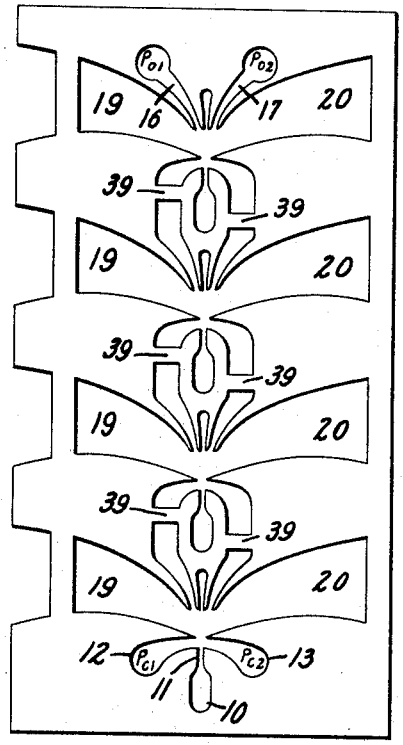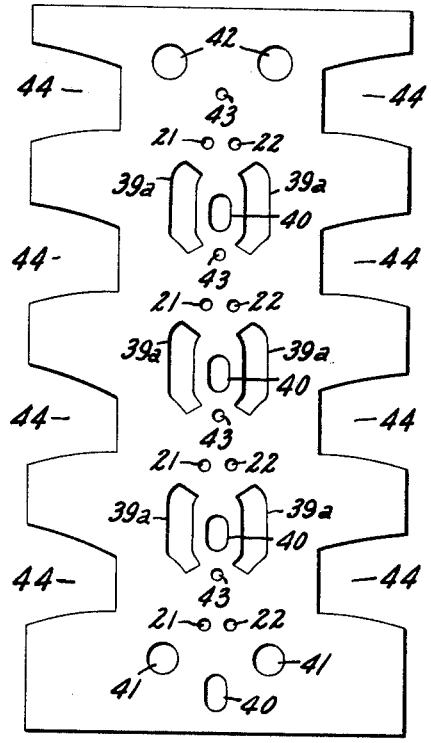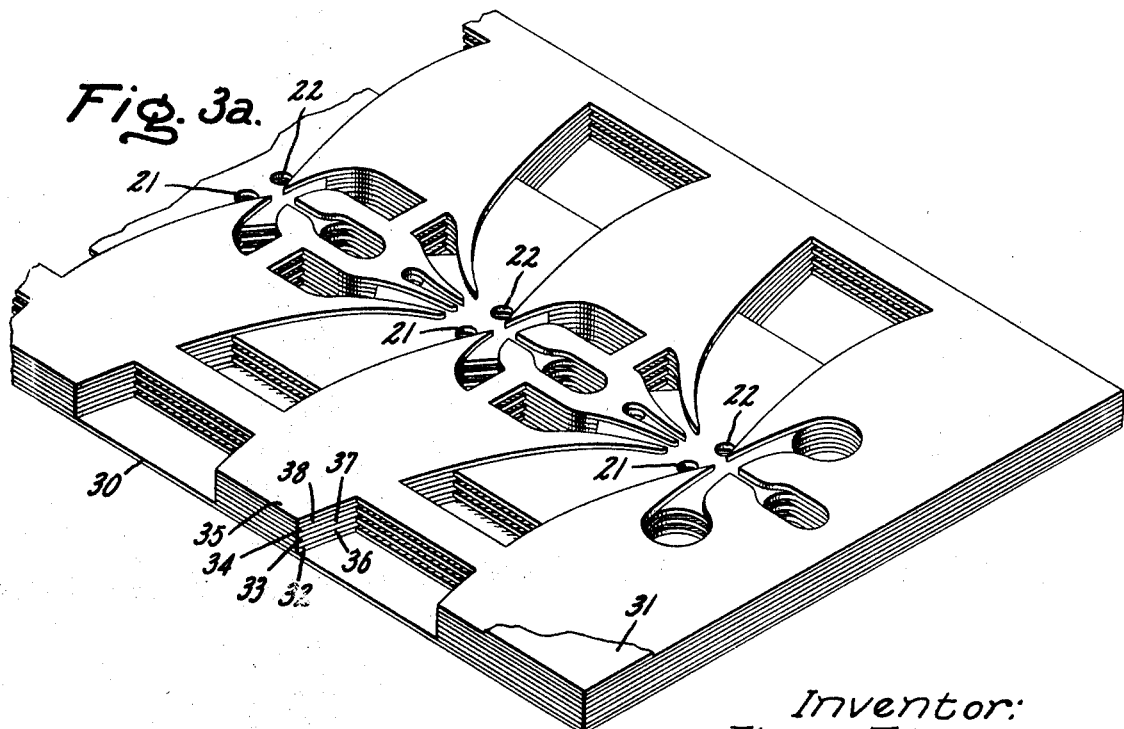

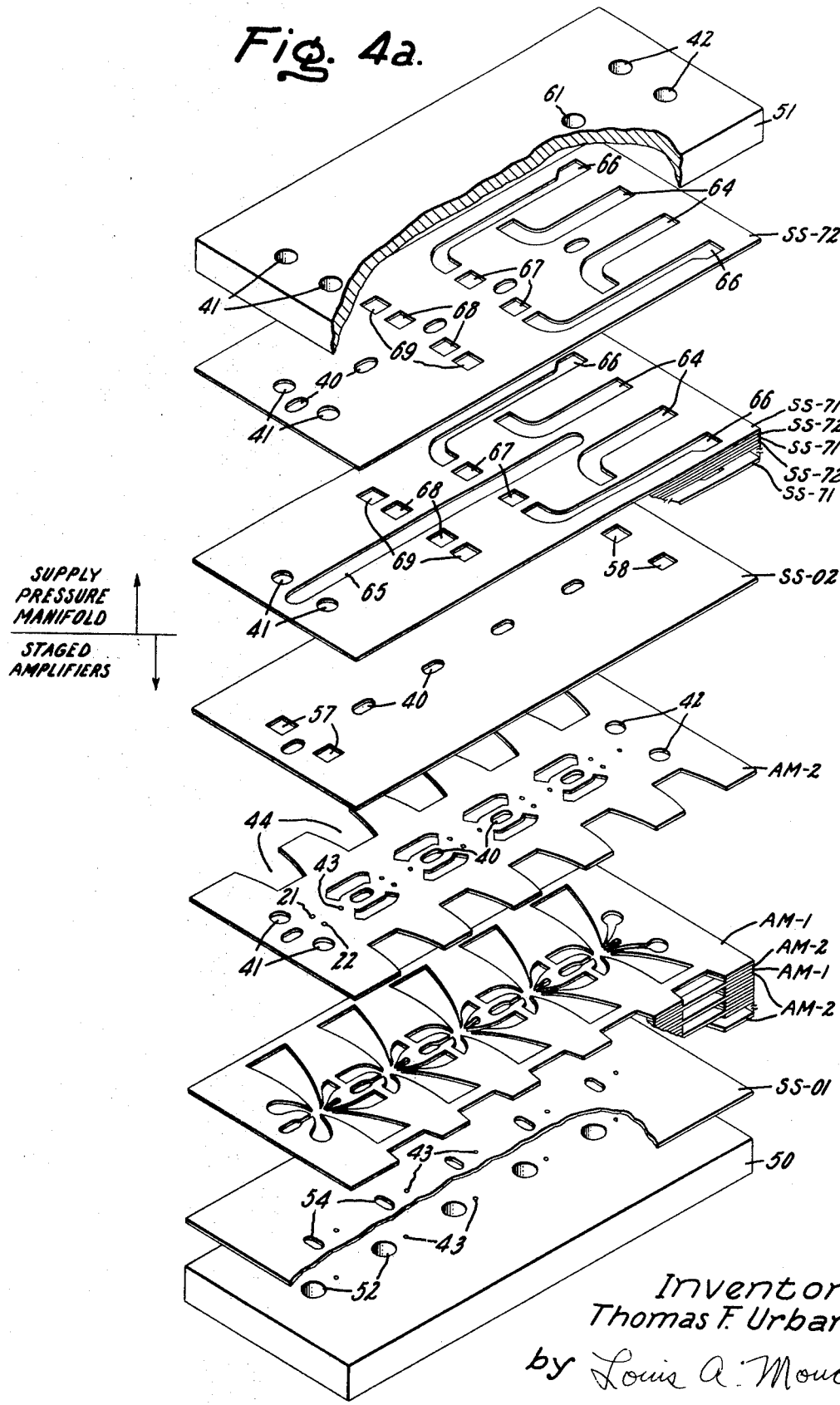

Inventor:
Thomas F. Urbanosky.
by Louis A. Moucha

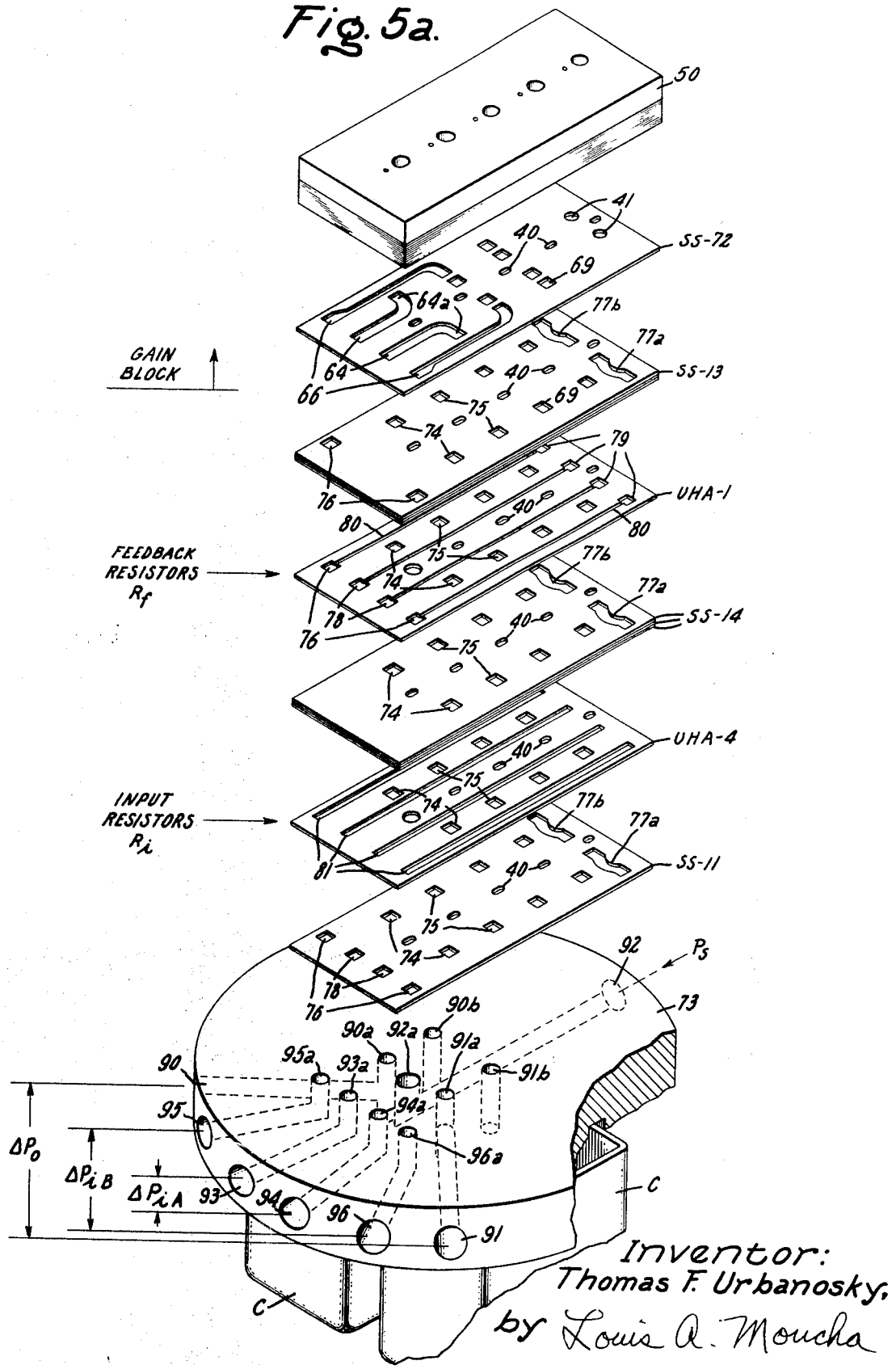

Inventor:
Thomas F. Urbanosky,
by Louis A. Moucha

Inventor:
Thomas F. Urbanosky,
by Louis A. Moucha

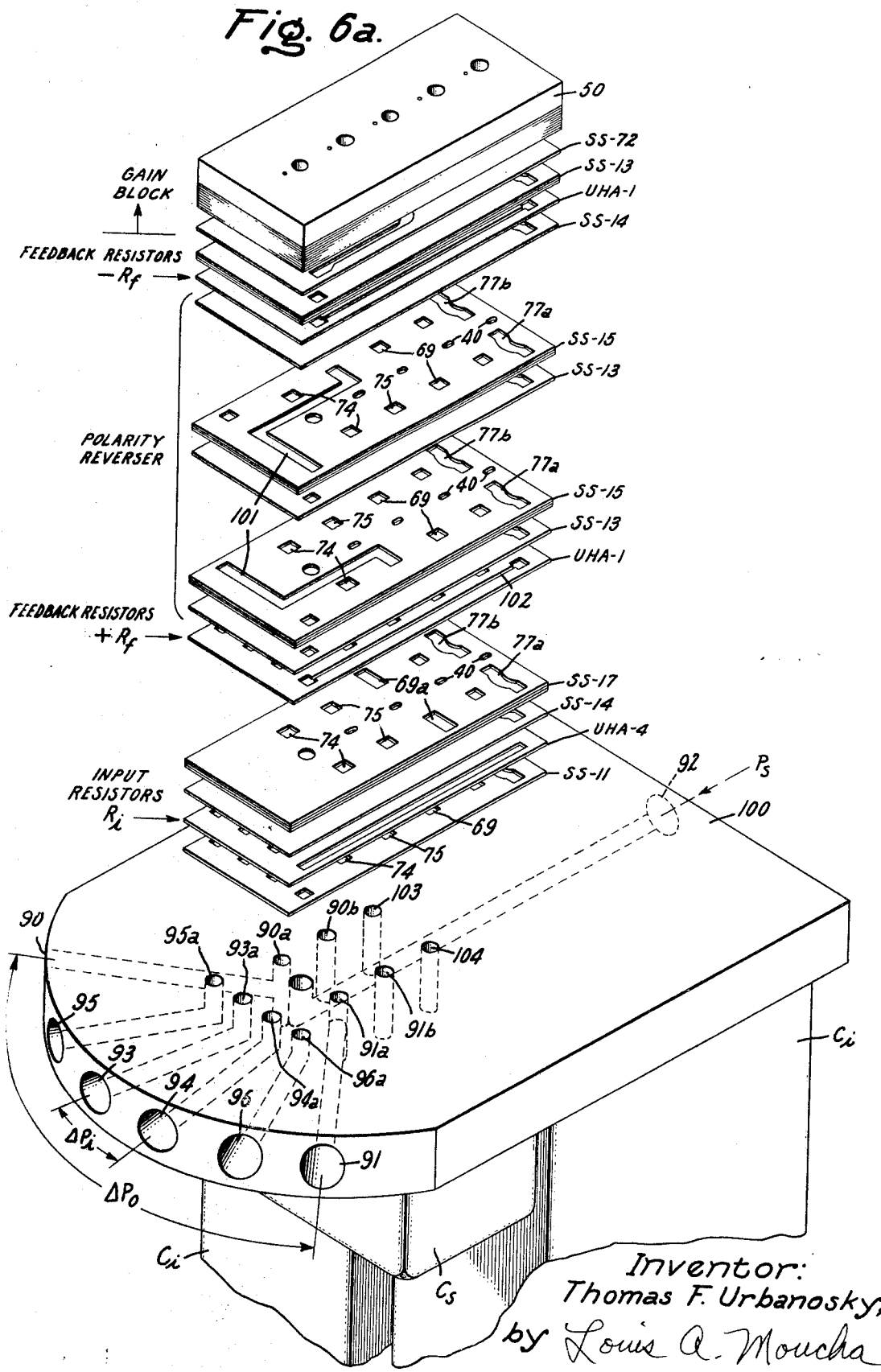

Inventor:
Thomas F. Urbanosky,
by Louis A. Moucha

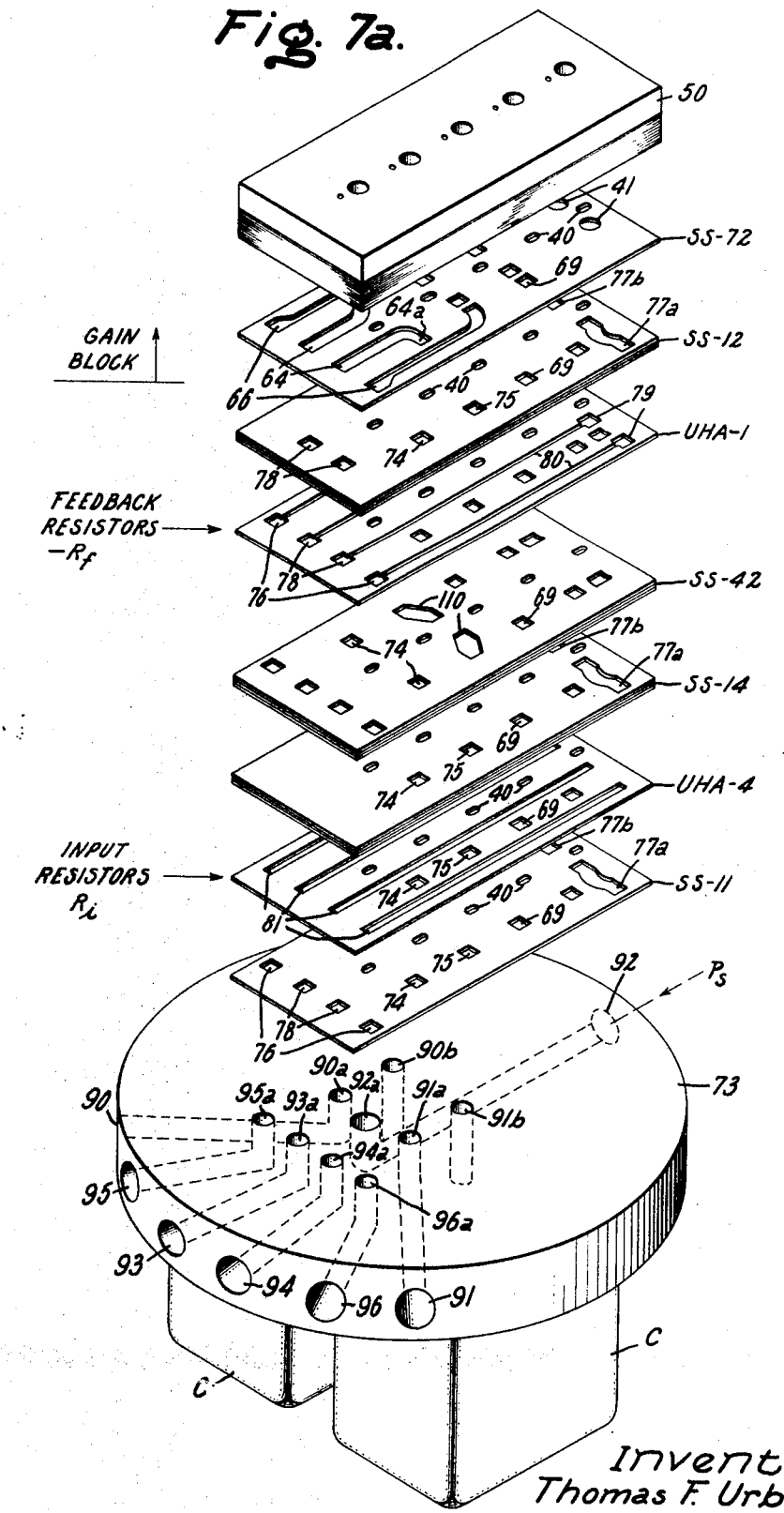

Inventor:
Thomas F. Urbanosky,
by Louis A. Moucha

HIGH SIGNAL-TO-NOISE FLUID AMPLIFIER AND FLUIDIC COMPONENTS

My invention relates to certain improvements in the no-moving mechanical parts fluid control devices known as fluid amplifiers, and in particular, to an improvement which obtains a high signal-to-noise ratio and other desirable characteristics.

This application is a continuation-in-part application of Ser. No. 575,092, filed on Aug. 25, 1966, entitled "High Signal-to-Noise Ratio Fluid Amplifier", now abandoned, and assigned to the same assignee as this application.

The recently developed fluid control devices having no-moving mechanical parts and known as fluid amplifiers have many advantages over analogous electronic circuitry. In particular, the fluid amplifier is relatively simple in design, inexpensive in fabrication, capable of withstanding extreme environmental conditions such as shock, vibration, nuclear radiation and high temperature and the no-moving parts feature permits substantially unlimited lifetime thereby achieving long periods of uninterrupted operation. These devices may be employed as analog and digital computing and control circuit elements, and also as power devices to operate valves and the like. The analog-type of fluid amplifier is commonly referred to as the momentum exchange type wherein a main or power fluid jet is deflected by one or more control jets directed laterally at the power jet from opposite sides thereof. The power jet is normally directed midway between two fluid receivers and is deflected relative to the receivers by an amount proportional to the net sideways momentum of the control jets. This device is therefore commonly described as a proportional or analog device. An example of a typical analog-type fluid amplifier is illustrated in U.S. Pat. No. 3,181,546 to W.A. Boothe and assigned to the same assignee as the present invention. In this prior art device, as in the case of all other prior art fluid amplifier devices, the various fluid flow passages of the device are intentionally formed with the smoothest surfaces possible to obtain minimum impedance to the flow.

The prior art analog devices, although satisfactory for many applications, have relatively low signal-to-noise ratios such that in a high gain system wherein several of these elements are serially connected to obtain the desired gain, the noise factor becomes a serious problem. In many analog circuits which require a high gain and, or a desired frequency response, such as in fluid control systems designed for high accuracy operation, the prior art analog fluid amplifiers and fluidic components employing such amplifiers have not been entirely satisfactory. Also, the prior art fluidic resistors utilized in such circuits have not been satisfactory since their resistance values are not precise.

Therefore, one of the principal objects of my invention is to provide an improved analog-type fluid amplifier having a high signal-to-noise ratio.

Another object of my invention is to provide a fluidic device comprising a plurality of parallel interconnected miniature analog fluid amplifiers in a laminated structure to provide a relatively high total gain at a relatively low noise level.

A further object of my invention is to provide a plurality of the laminated parallel interconnected miniature fluid amplifier devices connected in series circuit relationship to form a fluidic gain block component.

A still further object of my invention is to provide fluidic resistors in a laminated structure to obtain precise and predetermined resistance values.

Another object of my invention is to provide the gain block with selected fluidic resistors of the laminated structure type in negative feedback and input circuits to form a fluidic operational amplifier component.

A further object of my invention is to provide the gain block with various fluidic impedances in input and feedback circuits to form desired frequency-responsive fluidic circuit components such as the integrator and the like, all having no-moving mechanical parts.

The digital-type fluid amplifier is commonly referred to as the boundary layer effect type wherein the power jet becomes attached to one or the other of two side walls of an interaction chamber as determined by the control jets, and the power jet is thus directed to only one of the two fluid receivers at any instant of time. This device is therefore commonly described as a digital or switching device. Many of the prior art digital devices have an undesirable randomness in the switching point, that is, a relatively wide range of control fluid pressures within which the power jet becomes disattached from one side wall and switches the output to the other receiver. This randomness in the switching point is caused, at least in part, by a relatively low signal-to-noise ratio.

Therefore, a still further object of my invention is to provide an improved digital-type fluid amplifier having improved switching characteristics.

In carrying out some of the objects of my invention, I provide an analog-type fluid amplifier device which is comprised of the conventional power fluid inlet terminating in a nozzle for generating a power jet, at least one control fluid inlet terminating in a nozzle for generating a control jet directed laterally at the power jet, two fluid receivers downstream from the power nozzle, a center vent passage located along the centerline of the device as defined by the power nozzle and positioned between the receivers, and a pair of side vent passages. A high signal-to-noise ratio is obtained by providing the surface on at least either the upper or lower walls forming the various fluid flow passages of the device with a relative roughness of predetermined degree. This completely unexpected result of noise reduction may also be obtained by appreciably reducing the size of the flow passages, and in particular reducing the aspect ratio, of a fluid amplifier element fabricated in a small thin lamina and thence paralleling several separated elements in a laminated structure to form a device having the fluid flow capacity rating of an equivalent large element wherein the inherent slight roughness of the smooth passage wall surfaces of each small element produces the same effect as the deliberate surface roughening of the larger devices. Each lamina may further comprise a series circuit arrangement of several elements forming a high gain fluidic component having a high signal-to-noise ratio and several such separated laminae may also be paralleled in a stacked laminated structure to obtain a fluidic gain block component having the equivalent flow capacity rating of larger components. Additional laminae having narrow passages providing precise, predetermined feedback and input fluid resistance values may be stacked with the gain block to obtain a fluidic operational amplifier component. Various frequency-responsive fluidic circuit components all having no-moving mechanical parts are obtained by utilizing various fluid flow impedances with the gain block. A further improvement in the operation of the analog fluid amplifier element is achieved by the addition of small vent holes at each upstream side of the side vent passages immediately adjacent the power nozzle. The latter feature eliminates an instability caused by the natural flow entrainment of the power jet and also increases the gain and reduces the amplifier noise.

The features of my invention which I desire to protect herein are pointed out with particularity in the appended claims.

The invention itself, however, both as to its organization and method of operation, together with further objects and advantages thereof, may best be understood by reference to the following description taken in connection with the accompanying drawings wherein like parts in each of the several figures are identified by the same reference character and wherein:

FIG. 3a is a perspective view, partly broken away, of a high gain laminated fluidic component comprising a serial arrangement of paralleled miniature fluid amplifier elements;

FIGS. 3b and 3c illustrate in top plan the two types of laminae forming the layers of the staged fluidic elements illustrated in FIG. 3a;

FIGS. 4a, 4b and 4c illustrate unassembled, assembled and schematic views, respectively, of my "gain block" component partly illustrated in FIG. 3a;

FIGS. 5a, 5b, 5c and 5d illustrate unassembled, assembled, schematic views and frequency response characteristics, respectively, of my "operational amplifier" component;

FIGS. 6a, 6b and 6c illustrate unassembled, assembled and schematic views, respectively, of my "integrator" component;

FIGS. 7a, 7b and 7c illustrate unassembled, assembled and schematic views, respectively, of my fluidic lead-lag frequency-responsive component;

Figure 1A:
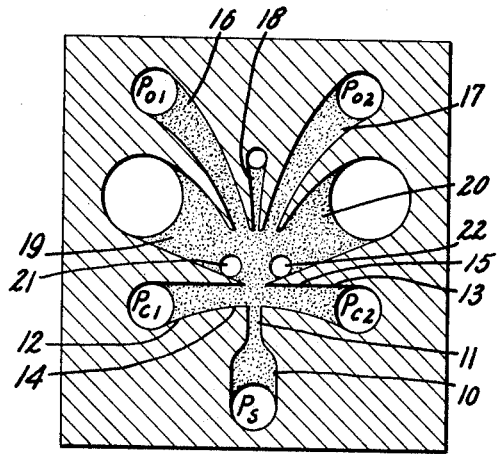
FIGS. 1a and 1b are views in top plan of two single stage analog-type fluid amplifier elements constructed in accordance with my invention.
Figure 1B:
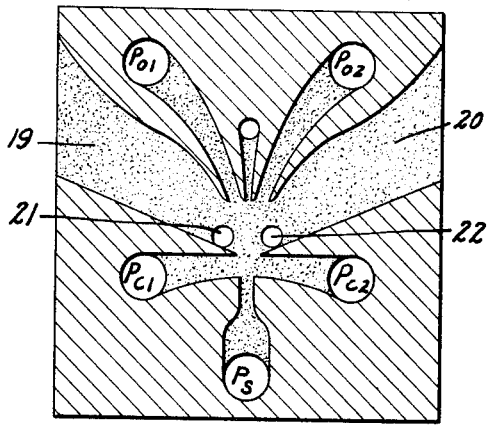

Referring now in particular to FIGS. 1a and 1b, there are shown two fluid amplifier elements of the analog type, each provided with at least two input fluid passages, one of which is a power fluid passage, and two output fluid passages. The particular fluid amplifier elements illustrated each have three input fluid passages, each comprising a fluid inlet terminating in a restrictor or nozzle to form a jet of fluid upon the particular inlet being in communication with a pressurized supply of fluid. Thus, the power fluid passage comprises a power fluid inlet 10 terminating in a nozzle 11 for generating a continuous power jet upon the inlet being supplied from a source $P_s$ of relatively constant pressurized fluid. Opposed control fluid passages comprising control fluid inlets 12 and 13 terminating respectively in nozzles 14 and 15 provide control jets of fluid directed laterally at the power jet for causing a proportional deflection thereof by momentum exchange, the degree of deflection being determined by the differential pressure ($\Delta P_c = P_{c1} - P_{c2}$) of the variable pressure sources $P_{c1}$ and $P_{c2}$ supplying the two control fluid inlets. The two output fluid passages 16 and 17, commonly described as fluid receivers, are often separated by a center vent passage 18. A pair of side vent passages 19 and 20 are generally positioned intermediate the receivers and control fluid inlets. The hereinabove described fluid flow passages of a fluid amplifier device are conventional, the conventional power nozzle 11 width being in a range of 0.020 to 0.040 inch. The power nozzle width selected for each amplifier is determined primarily by the fluid flow capacity rating that is required for the particular application of such amplifier. The various fluid passages and nozzles herein described are rectangular in cross section (in a plane normal to the direction of fluid flow), but it should be obvious that my invention is equally applicable to other cross-sectional shapes such as circular. A conventional type of 0.040 inch (power nozzle width) analog fluid amplifier has a signal-to-noise ratio in the order of 150 at an amplifier operating frequency (control signal ($\Delta P_c$ frequency) of 30 cycles per second (hertz) wherein the signal is defined as the peak-to-peak amplifier saturation and the noise is also defined in terms of its peak-to-peak value.

The conventional fluid amplifiers hereinabove described all have one common feature, they are fabricated from a solid material impervious to the particular fluid (gas such as air, or liquid such as water) employed with the effort being directed to obtain the surfaces of the walls forming the various fluid flow passages as smooth as possible to minimize impedance to fluid flow. I have discovered that providing a relative roughness to at least one of the surfaces or walls of the various fluid flow passages produces a desirable and completely unexpected result, that of a substantial reduction in the noise level which is inherently produced in the operation of fluid amplifiers. The surface roughness is preferably applied to the lower or upper walls of the various fluid flow passages rather than the side walls and must be controlled within relatively narrow limits to prevent substantial reduction in the flow capacity rating of the amplifier. Any of a number of methods may be employed to obtain the wall surface roughening, such as the application of an adhesive material to the desired surface and subsequently adding powdery material to the fluid passed through the amplifier. The powder adheres to the adhesive material to form the roughened surface. A second method comprises the spraying of the particular surface (before assembly of the fluid amplifier) with an epoxy and subsequently spraying such wet adhering surface with a selected powder. The particular particle material employed must obviously be chemically nonreactive with the fluid employed in the amplifier during normal operation thereof.

The surface roughness is illustrated in the FIGS. 1a and 1b embodiments by a stippling. The proper selection of particle size employed to obtain a significant reduction in noise level without a significant decrease in gain is governed by the ratio of particle size diameter to power nozzle width. It has been found that significant improvements in the signal-to-noise ratio are obtained by employing particles of size such that the ratio of particle diameter to power nozzle width is less than 1/10. Increases in signal-to-noise ratio from 2 to 10 times may readily be obtained in the larger fluid amplifier elements, that is, having power nozzle widths of at least 0.020 inch. Thus, in the case of the particular conventional 0.040 inch amplifier hereinabove described having a signal-to-noise ratio of 150, this characteristic was increased to 600 by roughening the bottom wall of the various fluid passages with 0.002 inch diameter aluminum oxide powder. This increase in signal-to-noise ratio is obtained over the entire operating frequency range of the particular amplifier element. Although all of the factors contributing to noise generation in fluid amplifiers are not completely understood, it is believed that one of the prime sources of noise is caused by the high shear or velocity gradient at the edge of the power jet which causes small vorticies to be formed along the edge of the jet, these vorticies being shed by the power jet. The roughened surface reduces the shear gradient along the jet edge thus making the power jet more stable.

The controlled roughness of at least the upper or lower walls of the various fluid flow passages is also beneficial in the digital-type fluid amplifier wherein the inherent noise is one cause of randomness in the switching point of the power jet. Thus, in the case of many digital elements, the surface roughness narrows the range of control pressures within which occurs the switching of the power jet from one receiver to the other.

Figure 2A:
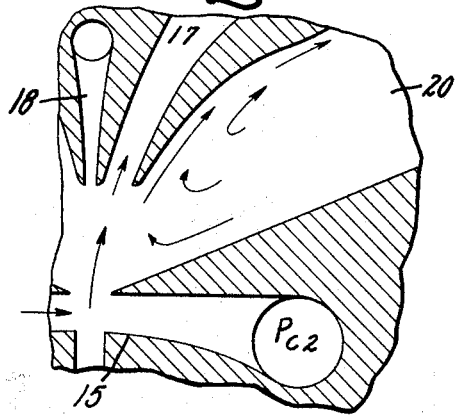
FIGS. 2a, 2b, 2c and 2d illustrate an unstable condition in the operation of an analog fluid amplifier and its elimination by providing a small vent hole at each upstream side of the side vent passages adjacent the power nozzle.
Figure 2B:
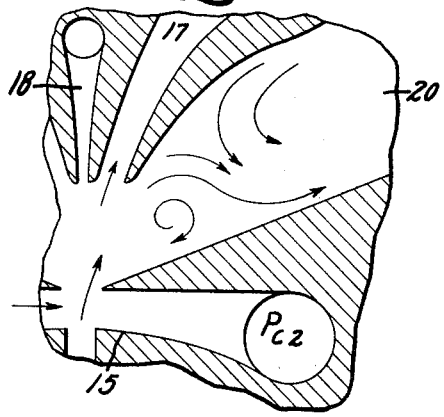
Figure 2C:
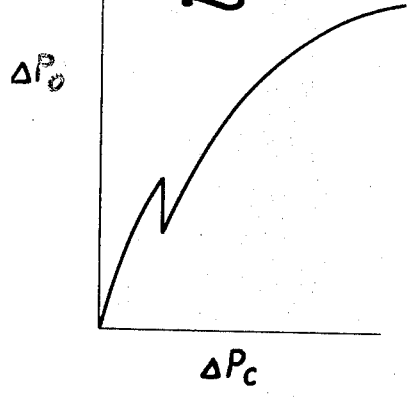
Figure 2D:
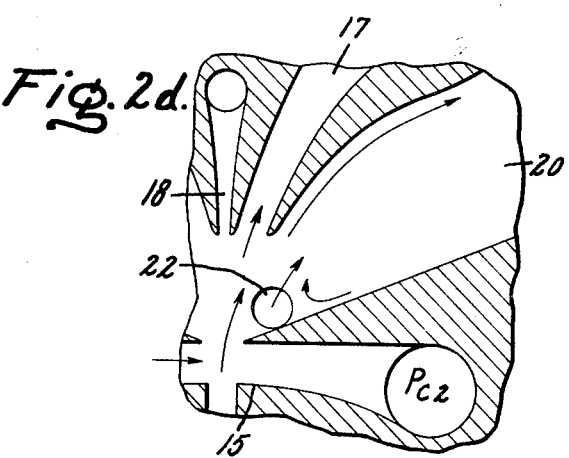

A further reduction in the noise level, as well as an increase in the gain of an analog-type fluid amplifier is obtained by the addition of small vent holes at each upstream side of the side vent passages immediately adjacent the power nozzle. These small vent holes 21 and 22 are formed through one or both of the cover plates of the fluid amplifier element, the bottom cover plate being shown, in part, as the stippled surface. Vent holes 21, 22 are preferably open to the atmosphere, although they may be connected by suitable conduits to a drain as is sometimes done with the outlets (indicated by the circles) of the center and side vent passages. The diameter size of the vent holes 21, 22 is in the range of one to two times the power nozzle width. It is to be understood that vent holes 21, 22 need not be circular in shape, the criterion being that they be positioned close to the origin of the power jet. Thus, a triangular shaped hole, having one side of the triangle coincident with the upstream edge of the side vent passage, and a second side relatively parallel to the path of the power jet, may be employed. Vent holes 21 and 22 provide an additional feature even more important than the reduced noise and increased gain in that they also eliminate a particular instability which may occur in the normal operating range of analog amplifiers due to the natural flow entrainment of the power jet. This instability is pictorially represented in FIGS. 2a and 2b wherein FIG. 2a illustrates a stable fluid flow condition prior to, and FIG. 2b illustrates a stable condition subsequent to, the instability. The flow entrainment causes a pressure reduction in the side vent passage area which, during the instability, becomes sufficiently significant to detach the vented or spill-over flow from the downstream side of the side vent passage, and become attached to the upstream side as indicated by the arrows. The instability is represented graphically in FIG. 2c as an infinite gain point in the normal operating range of the amplifier. The instability is eliminated by isolation of the entrainment and spill-over flow due to the small vent holes 21, 22. The use of the roughened wall surfaces described with relation to FIGS. 1a and 1b has also been found to eliminate the present instability due primarily to the fact that the roughened surface reduces the shear gradient at the edge of the power jet and thus makes it more stable. The function of small vent holes 21, 22 is illustrated in FIG. 2d wherein it is observed that a fluid such as ambient air enters the side vent passage 20 through vent hole 22 thereby maintaining the stable fluid flow conditions indicated in FIG. 2a over the entire operating range ($\Delta P_o$ vs. $\Delta P_c$) of the amplifier.

The improved noise reduction effect obtained by deliberate and controlled roughening of at least one of the walls of the various fluid flow passages may also be obtained by fabricating a fluid amplifier in miniature form whereby any inherent slight roughness (occasioned in the manufacturing process) in the otherwise smooth surfaces of the various fluid flow passage walls is equivalent to the controlled roughness deliberately provided in the larger amplifiers. The flow Reynolds Number is also much less in the miniature elements, resulting in thicker boundary layer flow and thus more stable flow conditions. The much smaller lengths and cross-sectional areas of the various fluid passages thus result in a much lower noise level in the miniature amplifier as well as improvement in the frequency response. A laminated structure comprising a parallel interconnection of several separated, miniature fluid amplifier elements having the fluid flow capacity rating of an equivalent larger size single element is the preferred embodiment of my high signal-to-noise ratio single stage fluid amplifier device. A single-stage fluid amplifier in laminated form comprises two cover plates provided with holes aligned with the input or output end of each of the various fluid passages and adapted for connection with suitable external fluid conduits. Intermediate the two cover plates are superposed a plurality of two different laminae, a first (flow pattern) lamina having formed therethrough a major part of the various fluid flow passages and the second (spacer) lamina including the remainder of the fluid flow passages in overlapping relationship with respect to the corresponding passages in the first lamina. The primary purpose of using the spacer laminae is to produce separate miniature fluid amplifier elements which are connected in parallel relationship to obtain the desired flow capacity rating, but they also result in all of the laminae having greater structural rigidity and thus permit ease of handling in the assembly process. The assembled fluid amplifier device thus includes a plurality of alternate layers of flow pattern laminae and spacer laminae. Each layer of flow pattern laminae may comprise one or more individual lamina, as determined by the desired aspect ratio (height to width) of the power nozzle since each lamina is preferably of equal thickness dimension. Generally, only one spacer lamina is employed in each layer thereof, although more can be used, if required by the circumstances. Each spacer lamina also includes holes aligned with the input ends of the power fluid inlet and control fluid inlets, and also includes the small (entrainment) vent holes in the side vent passages immediately adjacent the power nozzle as described hereinabove. In the case of amplifiers employing side vent passages not extending to the edge of the flow pattern lamina as in FIG. 1a, and center vent passages, additional holes aligned with the output ends of such passages are provided in the spacer laminae to complete the parallel interconnection between the separate miniature amplifiers. The two cover plates enclose the first and last layers of flow pattern laminae.

A single-stage parallel amplifier device as hereinabove described may be utilized in a fluid amplifier circuit, but the paralleling technique is particularly applicable for the cases where a series circuit connection of amplifiers is required to achieve a high gain. The structure of the single-stage amplifier device may be appreciated by reference to FIG. 3a which illustrates a four-stage laminated, paralleled, analog fluid amplifier component (gain block) partly broken away. The four-stage gain block, as well as the single-stage device, is comprised of a bottom cover plate 30 and a top cover plate 31, one of which contains the inlet and outlet holes for providing communication between external fluid conduits and the corresponding fluid passages in the device. Intermediate the two cover plates are superposed a plurality of alternate layers of flow pattern laminae 32, 33, 34, 35 and spacer laminae 36, 37 and 38. The flow pattern lamina is illustrated in FIG. 3b wherein it is noted that there is an incomplete fluid flow path 39 between each fluid receiver and the associated control fluid inlet of the next succeeding stage. The flow pattern lamina also has an incomplete flow path for each of the side vent passages. The spacer lamina is illustrated in FIG. 3c and includes overlapping passages 39a for completing the receiver-to-control fluid inlet paths in adjacent flow pattern laminae, holes 40 for supplying the power fluid to each amplifier of each stage, holes 41 for supplying the control fluid to the first stage, and holes 42 for interconnecting the outputs of the receivers of the last stage. The spacer lamina further provides the small (entrainment) vent holes 21, 22 immediately adjacent the power nozzle along the upstream side of the side vent passages as hereinabove described. Finally, the spacer lamina also includes holes 43 for interconnecting the center vent passages within each particular stage, and overlapping cutouts 44 for completing the flow paths in the side vent passages in adjacent flow pattern laminae. Although the asymmetrical flow pattern laminae are all shown in one orientation in the stacked arrangement of FIG. 3a, it is preferred to flip over alternate flow pattern lamina about the centerline axis passing through the power nozzles 11 and center vents (i.e., alternately stacking them face-to-back and back-to-face) for preventing generation of any bias pressures. The laminated amplifier structure, single-stage or multistage, thus comprises a plurality of superposed flow pattern (i.e., separate fluid amplifier elements) and spacer laminae, the selected plurality of flow pattern laminae being determined by the fluid flow capacity rating of the amplifier component. The various flow passages and holes may be formed through the laminae by any conventional method such as stamping, etching or molding. The assembled laminae may be held together in fluid-tight relationship by any conventional means such as an adhesive material, bonding or screws.

The laminated structure of a plurality of parallel interconnected, separated miniature fluid amplifier elements provides an especially low noise level component since the noise of the separate amplifier elements is not additive but is rather an average, or more correctly, the root-mean-square of the various noise levels. The reduced noise level permits the attainment of high signal-to-noise ratios so that it is feasible to design high gain fluid amplifier blocks for high accuracy control systems which were not previously practical with the larger size single-element amplifiers. The miniaturization of each amplifier also provides improved frequency response due to the smaller transmission time through the smaller amplifiers. The redundancy of the paralleling technique also enhances operating reliability from one to three orders of magnitude. The latter two advantages, even in the absence of any increase in signal-to-noise ratio, indicates that my invention is also applicable to the digital type of fluid amplifiers. As an illustration of the improved characteristics of the paralleled miniature amplifier, an analog amplifier having the flow capacity rating of a conventional 0.020 inch power nozzle amplifier with an aspect ratio of 1.0, but being constructed of eight paralleled, separated, 0.004 inch thick flow pattern laminae each having a 0.010 inch power nozzle, has a signal-to-noise ratio of 10,000 at an operating frequency of 30 hertz compared to 300 for the conventional amplifier. As indicated in this particular example, the reduced aspect ratio (from 1.0 for the conventional 0.020 inch amplifier to 0.4 for this particular example of my paralleled miniature amplifier) is an important factor in increasing the signal-to-noise ratio of my fluid amplifier. The reduced aspect ratio (less than 1.0) results in increasing the effect of the boundary layer flow in much the same manner that the use of miniature fluid amplifier elements and smaller flow Reynolds Number results in thicker boundary layer flow as described previously. The increased effect of the boundary layer flow thus provides more stable flow conditions thereby decreasing the noise level and increasing the signal-to-noise ratio. Thus, an improvement in the noise level of more than one order is obtained with my invention. A still further advantage of the laminated, paralleled structure of miniature amplifiers is the reduced size of the overall device. This reduction in size is especially apparent in the multistage component such as illustrated in FIG. 3a. A four-stage gain block constructed of alternate layers of the laminations shown in FIGS. 3b, 3c and having 0.010 inch (width) power nozzles has a length dimension of 1 ¼ inch, a width of twenty-one/thirty-second inch and a height or thickness of 0.068 inch. The four-stage gain block provides an overall gain of 1,000 and a signal-to-noise ratio of 1,000 at 30 hertz. An equivalent gain block (same flow capacity rating and overall gain) employing conventional 0.020 inch power nozzle elements would have a size of approximately 1" × 2½" × 0.028" and a signal-to-noise ratio of 77. The above thickness dimensions are without the cover plates. With cover plates in place, the thickness dimensions would be approximately equal or even smaller for my laminated structure since the surface area of the 0.010 inch element is one-fourth that of the 0.020 inch element and thus a thinner cover plate may be employed to obtain the same uniform stress distribution on the elements for sealing purposes.

Figure 4B:
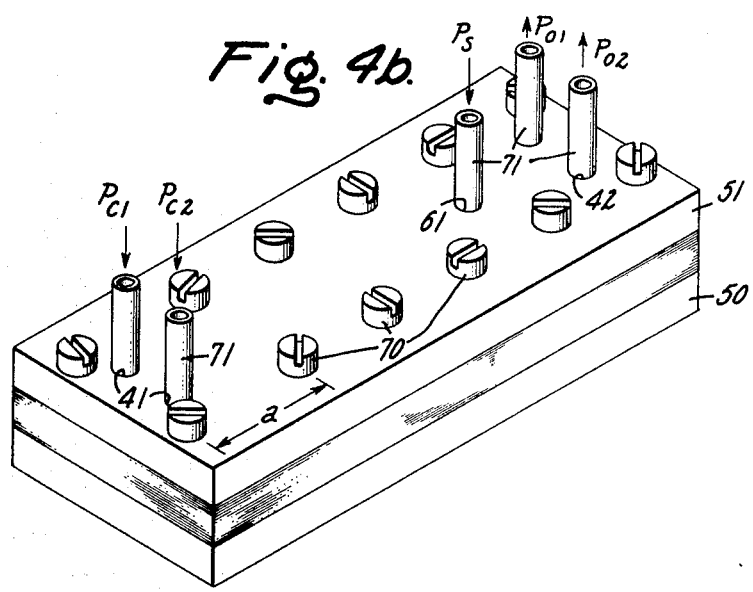

The gain block component illustrated in FIG. 3a is satisfactory for many applications, however, a more preferred embodiment of my fluidic gain block component is illustrated in FIGS. 4a and 4b which show a laminated, fluidic gain block comprising five staged amplifiers of the type illustrated in FIGS. 3a, 3b and 3c and an internal supply pressure manifold for supplying the desired power fluid pressures to each amplifier stage while utilizing only one external connection to the power fluid source. The function of the pressure manifold is to receive the power fluid supply at the fifth stage power fluid inlet and to manifold it through a fluid flow resistive path to the succeeding four stages. The (power fluid) supply pressure ratio between each of the stages is an important factor in determining the amplifier characteristics of gain, saturation, linearity and signal-to-noise ratio. I have found that the overall pressure ratio (from the fifth to the first stage) should be in the range from 25:1 to 5:1 for a fifth stage supply pressure range of 25 pounds per square inch gage (p.s.i.g.) to 2 p.s.i.g., respectively. This compares to an overall pressure ratio of 450:1 required for prior art 0.040 inch amplifier five-stage gain blocks. This reduction in overall pressure ratio permits 18 to 90 times more feedback gain which may be applied for operational amplifier purposes to be described with relation to FIG. 5a, obtains greater decoupling between stages, and permits accurate "signal limiting".

In many control circuit applications it is desirable or even necessary that the gain block output remain constant at its saturation level whereas an individual amplifier output generally begins to droop at saturation as it is further overdriven. I have determined that the droop is controllable in the case of staged amplifiers by proper choice of pressure ratios between amplifiers. Thus, as seen in the FIGS. 4d and 4e plots, a flat saturation is obtained from a five-stage gain block when the various power fluid pressures are chosen such that each stage begins to saturate as it drives the next succeeding stage to saturation. The most important pressure ratio is that between the fifth and fourth stages and should be in the range from 2.5:1 to 4:1 for a fifth stage supply pressure range of 1 to 25 p.s.i.g., respectively. The first four interstage pressure ratios are not as critical and are usually in a range from 1:1 to 2.5:1, it being understood that supply pressure increases in going from the first stage to the latter stages. The signal limiting function can be observed in FIGS. 4d and 4e wherein it is noted that the saturation level remains constant and it has been found that the gain block can be overdriven with no loss in output by control pressures which are 100 times greater than that required for saturation.

In general, lower supply pressures permit a reduction in pressure ratios between stages and as stated above, obtain more decoupling therebetween. Maximum decoupling is obtained by a minimum difference in supply pressures between stages.

Finally, I have found that (1) signal-to-noise ratio increases as the first stage supply pressure is reduced and pressure ratios between stages are increased, and (2) gain increases as the first stage supply pressure is increased and the (power nozzle) aspect ratio is increased, it being appreciated that gain increase alone also includes a corresponding noise increase.

Thus, the selection of supply pressures for each stage and for pressure ratios between stages is an important factor determined by considerations such as overall gain, signal-to-noise ratio, decoupling between stages, saturation levels and flatness of the saturation. Since the power supply pressures are different for each stage of my five-stage gain block for most efficient operation thereof, the use of an internal supply pressure manifold obviates the need for five separate tubes or other conduits feeding the five power fluid inlets and permits the use of a single supply input.

Referring now in particular to FIG. 4a, there are shown the various elements of a preferred embodiment of my gain block component including a supply pressure manifold and five staged analog-type fluid amplifiers of the laminated, paralleled, separated, miniature type illustrated in FIG. 3a, the elements being shown in superposed position prior to assembly (by stacking in the same order) for purposes of indicating the relative positions of the various flow passages and apertures in the elements. For purposes of simplification, a plurality of screws (twelve in this particular embodiment) for retaining the assembled device in fluid tight relationship are not illustrated in FIG. 4a but are shown in the assembled view in FIG. 4b.

The staged amplifier portion of the gain block component is illustrated in the lower part of FIG. 4a and includes a base plate 50, a single lamina designated SS-01, a plurality of alternate laminae designated AM-2 and AM-1 and a single lamina designated SS-02. The various laminae, base plate and cover plate 51 have identical length and width dimensions and vary only in the thickness dimension. Thus, in a particular embodiment now to be described, base plate 50 and cover plate 51 each have a thickness of one-eighth inch, width of twenty-one/thirty-second inch, length of 1 9/16 inch, and are both fabricated of anodized aluminum. Obviously, these plates could also be formed from other metals or other suitable material such as a plastic. Base plate 50 has formed therethrough along the centerline axis of the gain block component five equally spaced large size circular apertures 52 and five equally spaced small size circular apertures 43. Apertures 52 completely overlap entrainment vent holes 21, 22 in each of the spacer laminae (designated AM-2), and apertures 43 are aligned with center vents 43 therein. As mentioned above, a plurality (twelve in this particular embodiment) of screw holes are also formed through the base and cover plates and each lamina for retaining the gain block component in fluid tight relationship.

Lamina SS-01 is stacked on base plate 50 and has formed therethrough along the centerline axis five equally spaced large size apertures 54 elongated in the lamina width direction and having curved ends, and five equally spaced small circular apertures 43, spaced from apertures 54 and of size identical to and aligned with apertures 43 in base plate 50. Apertures 54 and 52 (in base plate 50) are also aligned and apertures 52 completely overlap apertures 54. Lamina SS-01, and each of the other laminae in the staged amplifier portion of the gain block component are 0.004 inch thick and fabricated of stainless steel ASTM No. 304. The laminae may obviously be fabricated from other suitable materials such as beryllium copper and the like, as desired. A convenient method of manufacturing all of the laminae to be hereinafter described is by chemical milling wherein the nonperforated lamina is coated on both sides with a photo resist material, a negative of the pattern to be etched is placed on the lamina and then exposed to ultraviolet radiation for sensitizing the selected portions of the photo resist material. Finally, the lamina is placed in an acid solution to cause the sensitized photo resist material to etch through the desired pattern. The choice of 0.004 inch thick laminae has been found to be convenient as a particular embodiment, however, it is not to be interpreted as a limitation on my invention since thicknesses greater and less than this value may also readily be employed. The minimum thickness is determined primarily by the cost of the laminae materials which invariable increases with decreasing thickness. At the present time, a minimum thickness of .001 inch is economically feasible for the laminae utilized in all of my fluidic components herein described. A plurality of alternate spacer AM-2 and flow pattern AM-1 laminae are next stacked on lamina SS-01 having a spacer lamina AM-2 in contact with lamina SS-01. Spacer and flow pattern laminae AM-2 and AM-1 correspond to the laminae illustrated in FIGS. 3c and 3b, respectively, the only distinction being that the FIG. 4a laminae include five staged amplifiers as compared to the four amplifiers in FIGS. 3b and 3c. As described with relation to FIG. 3a, the particular plurality of spacer and flow pattern laminae is determined by the desired fluid flow capacity rating of the gain block, and asymmetrical laminae AM-1 are alternately stacked face-to-back and back-to-face to prevent generation of undesired bias pressures. Symmetrical laminae AM-2 are also alternately stacked face-to-back and back-to-face to average out geometry and etching imperfections which could influence the fluid flow field and thereby virtually eliminate the generation of unwanted bias pressures and other undesirable effects. Unless otherwise stated, all the hereinafter stackings of a plurality of identical symmetrical laminae and the gain block nonsymmetrical AM-1 laminae are alternately face-to-back and back-to-face. In general, "n" flow pattern laminae AM-1 and "n + 1" spacer laminae AM-2 are employed, the particular embodiment being described employing nine spacer laminae AM-2 and eight flow pattern laminae AM-1 alternately superposed, as shown. The staged amplifier portion of the gain block component is completed by a lamina SS-02 stacked on the top-most spacer lamina AM-2, as shown. Lamina SS-02 includes five equally spaced apertures 40 slightly elongated in the lamina length direction, located on the centerline axis and aligned with and of equal size as apertures 40 in the AM-2 laminae. Lamina SS-02 also includes a first pair of square apertures 57 aligned with apertures 41 in the AM-2 laminae, and a second pair of square apertures 58 (both pairs may also be circular) aligned with apertures 42 in the AM-2 laminae, each pair symmetrically disposed about the centerline axis.

The stacking of the elements of the staged amplifier portion of the gain block component in the order as indicated above and illustrated in FIG. 4a, that is, base plate 50, lamina SS-01, alternate "n + 1" AM-2 and "n" AM-1 laminae, and lamina SS-02 provides the following communication between the laminae and base plate. The side entrainment vent holes 21, 22 in spacer laminae AM-2 are provided with passage to ambient through lamina SS-01 and base plate 50 by means of apertures 54 and 52, respectively. In like manner, the center vents, aperture 43 in laminae AM-2, are provided with passage to ambient through lamina SS-01 and base plate 50 by means of apertures 43. All other fluid pressures (control input signal, amplified output and power fluid supply) are dead-ended from the base plate by lamina SS-01. However, it may be noted that base plate 50 and lamina SS-01 have similar, aligned apertures, and therefore lamina SS-01 is not a necessary element but is used as a convenience to separate the staged amplifiers from the base plate. Also, vent holes 21, 22 and 43 are dead-ended from the supply pressure manifold by lamina SS-02. Lamina SS-02 also dead-ends the control signals after the first stage from the supply pressure manifold. The control input signal to the first stage is supplied via the supply pressure manifold through apertures 57 in lamina SS-02, and the amplified output signal from the fifth stage is provided through apertures 58 in lamina SS-02 to the supply pressure manifold. The dimensions of aligned apertures are generally made identical, or nearly so, for reducing fluid flow resistance therethrough. Finally, apertures 40 in lamina SS-02 supply the power fluid supply pressure to each staged amplifier.

The supply pressure manifold is constructed of a top cover plate 51 and a plurality of alternately superposed laminae SS-72 and SS-71 of equal number. Cover plate 51 includes a pair of circular apertures (ports) 42, aligned with apertures 42 in laminae AM-2 and apertures 58 in lamina SS-02, which comprise the output terminals of the gain block, and a second pair of circular apertures (ports) 41 aligned with apertures 41 in laminae AM-2 and apertures 57 in lamina SS-02 which comprise the input terminals. Thus, the control input signal is supplied to the first stage amplifier by means of ports 41 in cover plate 51 (and apertures 41, 57) and the amplified output of the fifth stage is available at ports 42 in the cover plate. A fifth aperture (port) 61 in cover plate 51 is positioned along the centerline axis for supplying the pressurized power fluid to the gain block.

Laminae SS-72 each include five equally spaced apertures 40 along the centerline axis of the same size and configuration (for uniformity in manufacture) as apertures 40 in lamina SS-02 and are aligned therewith. Laminae SS-72 also include a pair of circular apertures 41 of size equal to apertures 41 in cover plate 51 and aligned therewith for supplying the control input signal to the first stage amplifier. Laminae SS-72 also include a first pair of symmetrical wide channels 64 having first ends thereof aligned with the gain block output ports 42 in cover plate 51 and therefore, obviously aligned with apertures 58 in lamina SS-02 and apertures 42 in spacer laminae AM-2. Laminae SS-72 also include a second pair of symmetrical wide channels 66 and three pairs of symmetrically disposed square apertures 67, 68 and 69. It should be understood that for economy of manufacture, a minimum number of different type laminae are produced and thus various apertures and channels may not be used in the gain block (as in the case of apertures 67, 68, 69 and channels 64, 66 in laminae SS-72) but have use in other components such as the operational amplifier to be subsequently described. Laminae SS-71 have the same apertures and channels as laminae SS-72 except for a centerline axis channel 65 of length and width sufficient to overlap apertures 40 in laminae SS-72. The effective height dimension of center channel 65 is varied by the alternate stacking of SS-71 laminae using the SS-72 laminae as separators. The effective height of channel 65 determines the fluid flow resistance to, or pressure drop of, the power fluid in passing from the fifth stage end aligned with power fluid inlet supply port 61 to the fourth, third, second, and finally the first stage which, is at the lowest pressure level as described hereinabove. The SS-71 laminae are fabricated in both 0.004 inch and 0.002 inch thicknesses to obtain a greater combination of fluid flow resistances whereas separator laminae SS-72 are each of 0.004 inch thickness only. A preferred stacking arrangement for the particular manifold embodiment herein described and illustrated in FIG. 4a utilizing a pressurized power fluid source of 10 p.s.i.g. includes in the order as illustrated in FIG. 4a, four pairs of alternately superposed SS-72 and SS,71 laminae wherein each SS-71 lamina is of 0.002 inch thickness, and two additional pairs of alternately superposed SS-72 and SS-71 laminae wherein each SS-71 lamina is of 0.004 inch thickness. Thus, an SS-72 lamina is in contact with cover plate 51 and an SS-71 lamina is in contact with lamina SS-02 in the staged amplifier portion of my gain block.

Referring now to FIG. 4b, there is shown the gain block component of FIG. 4a after assembly, and further shows twelve fillister head type machine screws 70 which in one particular embodiment are of size 4/40 for retaining the various laminae and cover and base plates in fluid tight communication. Corresponding machine nuts (not shown) are provided on the underside of base plate 50 for engagement with the machine screws. The various laminae, base and cover plates, may be assembled in any suitable manner such as by inserting dowels through two of the diagonal corner screw holes to align the various members during the stacking procedure, and then inserting and tightening the first ten screws 70. The means for providing communication between the inlet and outlet ports in cover plate 51 and external fluid conduits (tubing) may comprise any suitable fittings 71 which as one example may be one-sixteenth inch diameter barb fittings securely fastened within the ports. The overall dimension of my gain block component including the cover and base plates and thirty-one laminae therebetween is 1 9/16 inch long, twenty-one/thirty-second inch wide and three-eighth inch thick (height dimension) whereas the fittings 71 extend another one-fourth inch in the height dimension. The 12 holes through which screws 70 are fitted comprise five pairs equally spaced in the longitudinal direction and a sixth pair at the port 41 end of the component more greatly spaced (spacing "a") from the fifth pair to prevent incorrect (backward) superposition of any lamina.

Figure 4C:
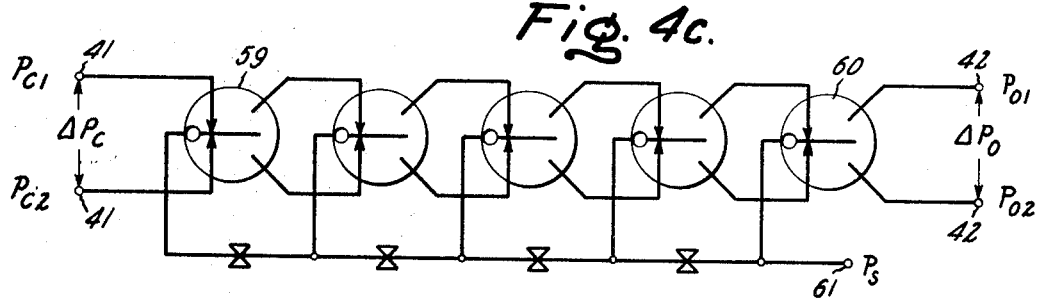
Figure 4D:
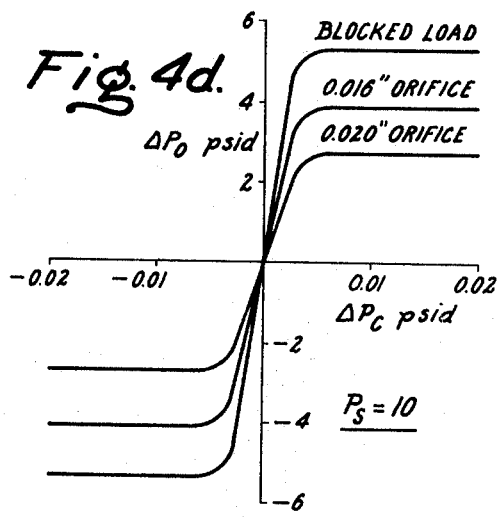
FIGS. 4d, 4e illustrate various gain characteristics of my gain block.
Figure 4E:
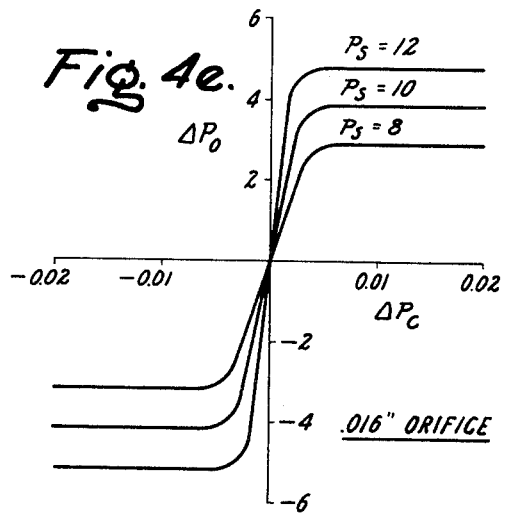

The schematic diagram of my five-stage gain block component is illustrated in FIG. 4c wherein the differential pressurized control input signal $\Delta P_c = P_{c1} - P_{c2}$ is supplied through ports 41 in cover plate 51 to the first stage fluid amplifier 59 and the amplified differential pressurized output signal $\Delta P_o = P_{o1} - P_{o2}$ is available at ports 42 corresponding to the output of the fifth stage amplifier 60. The power fluid supply pressure $P_s$ is supplied to port 61 and is distributed to the power fluid inlet of each amplifier stage at a particular pressure by means of the internal supply pressure manifold illustrated in FIG. 4c whereby a fluid flow resistance is generated across each section of channel 65 in combined laminae SS-71, 72 shown in FIG. 4a.

FIGS. 4d and 4e illustrate various gain characteristics of my five-stage gain block, the data being taken with air as the pressurized fluid medium at a temperature of 68°F. The stacking arrangement of the amplifier portion was eight pairs of alternately superposed AM-1 and AM-2 laminae wherein each lamina is of .004 inch thickness. Obviously, other gases or liquids may also be used as the fluid medium. FIG. 4d illustrates signal amplification at (fifth stage) constant supply pressure $P_s = 10$ p.s.i.g. with various loads in fluid communication with the receivers of the fifth stage (i.e., connected at ports 42) wherein the abscissa and ordinate are the differential control input signal and amplified output, $\Delta P_c$ and $\Delta P_o$, respectively, in pounds per square inch differential (p.s.i.d.). Each of the amplifiers has a power nozzle width of 0.010 inch as indicated with respect to the four-stage gain block illustrated in FIGS. 3a, 3b and 3c. In FIG. 4d, a relatively high gain of 2,350 is obtained for blocked load conditions of the gain block output, an intermediate gain of 1,610 is obtained for a load comprising a 0.016 inch diameter orifice at each output and a lower gain of 930 is obtained for a load comprising 0.020 inch diameter orifices.

FIG. 4e illustrates the variation of signal amplification at various power fluid supply pressures for a load comprising 0.016 inch diameter orifices. A relatively high gain of 2,300 is obtained for a supply pressure of 12 p.s.i.g., an intermediate gain of 1,610 is obtained for a supply pressure of 10 p.s.i.g. and a lower gain of 940 is obtained for a supply pressure of 8 p.s.i.g.

In view of the gain characteristics illustrated in FIGS. 4d and 4e and additional tests, it can be stated that the operating characteristics of my five-stage gain block component provide a linear output pressure range of up to ±15 p.s.i. for power fluid supply pressures of up to 30 p.s.i.g. Forward gains of 1,800 or more as determined by the load and supply pressures are readily achieved and a minimum signal-to-noise ratio of 200:1 is obtained over a frequency range of 0 to 25 hertz. The gain block input impedance is in a range of 4,500 to 23,000 sec./in.$^2$, varying as a function of supply pressure. The frequency response is a small phase shift (lag) of approximately 0.2° per hertz which is a substantial frequency response improvement over conventional 0.040 inch power nozzle gain blocks. Forward gains of 6,000 have been achieved for a supply pressure of $P_s = 30$ p.s.i.g.

My gain block component is an element of the "integrated circuit" components to be described hereinafter and all such components as well as the gain block having the following advantages, the containment of all the staged amplifiers and the supply pressure manifold within a single structure minimizes the plumbing and interconnection of elements which otherwise would be employed and require time consuming labor as well as resulting in reduced reliability due to possible leakage at the points of interconnection. Integrated circuit approach results in a great saving of space requirements, increased reliability due to the shortened paths between adjacent amplifiers, and improved frequency response.

In summary, my gain block component utilizes four different types of laminae in the staged amplifier portion, namely the SS-01, SS-02, AM-1 and AM-2 wherein the SS-01 and SS-02 lamina provide a separator or spacer (and dead-ending) action between the base plate 50 and supply pressure manifold, respectively, and the supply pressure manifold utilizes two different types of laminae, namely, the SS-71 and SS-72.

Figure 5B:
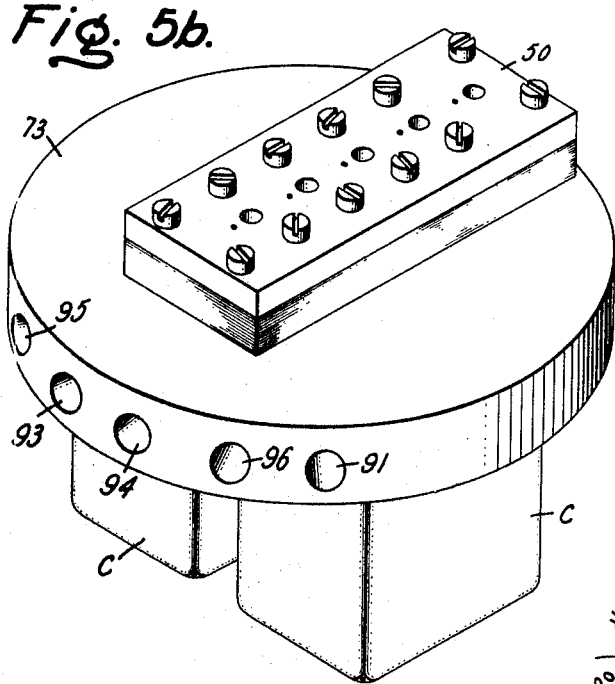

The first logical extension of my fluidic gain block component is its utilization in a fluidic operational amplifier component. My operational amplifier is essentially my gain block (comprising active staged fluid amplifiers) and the addition of passive fluidic feedback resistors for obtaining a closed loop circuit and an input circuit comprising fluidic input resistors. Due to the high gain which may be obtained with my operational amplifier, passive fluidic stabilizing capacitors are connected at the operational amplifier outputs, although there may be circuit applications wherein such stabilizing capacitors are not necessary (in the case wherein a relatively low closed loop gain is required). Referring to FIG. 5a, there is illustrated my operational amplifier in partially unassembled form wherein the various laminae are superposed in their proper order prior to assembly. Reading from top to bottom, my operational amplifier component includes a gain block, separator laminae designated SS-13, a feedback resistor lamina designated UHA-1, additional separator laminae designated SS-14, an input resistor lamina UHA-4, a separator lamina SS-11, a base plate 73 and a pair of stabilizing volumes C which function as fluidic capacitors. The gain block in the operational amplifier is the same as the gain block illustrated in FIG. 4a without the cover plate 51, and in the case of the particular embodiment of my operational amplifier (and other components) to be described, all of the laminae may have length, thickness and width dimensions as described with reference to the gain block laminae in FIG. 4a. Further, the gain block of FIG. 4a is inverted such that the base plate in FIG. 4a becomes the cover plate 50 of the operational amplifier in FIG. 5a. Thus, after the inversion, the bottom-most lamina of the gain block is SS-72 which is illustrated in FIG. 5a for purposes of indicating various fluid flow paths in the operational amplifier. As in the case of FIG. 4a (and the hereinafter unassembled views of other components) the twelve screw holes for retaining my operational amplifier fluid tight are not indicated in any of the FIG. 5a laminae or cover and base plates for purposes of simplification but evidently pass through each lamina and into the base plate 73 as is implied in the assembled view of FIG. 5b.

A brief background on operational amplifier theory is suggested at this point for an appreciation of the operation and subsequent advantages to be recited for my fluidic operational amplifier component. As illustrated in the schematic diagram of my proportional operational amplifier in FIG. 5c, a proportional operational amplifier comprises (1) an input circuit of fluidic linear resistors $R_{iA}$ (for a single differential control input signal $\Delta P_{iA}$) and $R_{iB}$ i(in the case of a second input signal $\Delta P_{iB}$) and a closed loop circuit comprising (2) a forward gain circuit of the gain block having a gain G and a time constant factor $\frac{1}{1+}$ where $\tau$ is the natural "RC" time constant of the circuit which includes the effect of the stabilizing capacitors C, the load ($R_L$) and output ($R_o$) resistance of the operational amplifier, and the feedback resistance $R_f$, and (3) a negative feedback network which includes the effect of the feedback resistance as well as the control port resistance ($R_c$) and to a lesser degree the input resistance ($R_i$). It is well known in control system (servomechanism) theory that the closed loop gain for a negative feedback circuit reduces to the mathematical expression (transfer function)

$$\frac{\Delta P_o}{\Delta P_i} = \left[\frac{R_f}{R_i} \frac{1}{1+\tau s/(1+GH)}\right]$$ when the open loop gain GH is substantially greater than 1. Typical values of open loop gain for my five-stage operational amplifier are 20 to 50, although this is no limiting range. In the above equation, "s" is the Laplace operator, $\frac{d(\ )}{dt}$.

This closed loop gain expression $\frac{\Delta P_o}{\Delta P_i}$ indicates that the circuit gain is independent of the forward gain G (except as a time constant consideration), and is dictated by the passive resistive components $R_f$ and $R_i$. Since these feedback and input fluidic resistors are stable and remain fixed, it is evident that the closed loop gain also remains constant regardless of changes in gain G of the gain block active component. For large values of open loop gain GH, the closed loop will oscillate at the frequency at which it accumulates 180° of phase shift since this would then result in positive feedback causing instability. The phase shift (lag) results from five small time constants associated with the five staged amplifiers and an inherent pure time delay. The oscillations would be of sufficient magnitude to reduce the open loop gain GH to 1 and therefore an attenuating or stabilizing device is added in series with the open loop GH network to decrease its gain to unity before it accumulates 180° of phase shift and thereby prevent instability (oscillation). The time constant $\tau$ of this attenuator or stabilizer is a predominant factor in obtaining stability since its time constant is greater than the small time constants in the five-stage gain block. The result of adding the stabilizing capacitors C is evident in the Bode diagram representation of the frequency response of my operational amplifier illustrated in FIG. 5d which is a plot of closed loop attenuation $\frac{\Delta P_o}{\Delta P_i}$ (in decibels, db) and phase lag versus input signal frequency (in radians per second). The break frequency $\omega_o$ (frequency at which the gain is initially attenuated at 20 db per decade) is $\frac{1+GH}{\tau}$. The stabilizing volume requirement is thus determined by the open loop gain GH and varies directly therewith. However, the frequency response remains the same since the time constant $\tau$ is divided by $1 + GH$ in the equation. Thus, large volume requirements imply large open loop gain GH and hence more accurate circuit performance. It cannot be too strongly stressed that the frequency response (gain and phase lag versus frequency) is the most significant factor in indicating both steady state and transient (dynamic) performance of the circuit.

Returning now to the description of FIG. 5a, channels 64 and 66 in lamina SS-72 of the gain block will be described for their function in the operational amplifier. The purpose of passages 64 is to channel the gain block output $\Delta P_o$ from the region of the inner output ports 42 in the cover plate 51 of FIG. 4a downward through outer bypasses comprising symmetrically disposed square apertures 74 in each of the laminae superposed below lamina SS-72 and aligned with ends 64a of channels 64. These aligned apertures 74 (and aligned circular holes 90a, 91a formed through base plate 73) bypass the gain block output $\Delta P_o$ into the stabilizing volumes C connected on the bottom side of base plate 73. The holes 90a, 91a formed through the base plate provide input passages to the fluidic capacitors C and are also provided with junctures for perpendicularly directed passages terminating in the operational amplifier output ($\Delta P_o$) ports 90, 91 in the side of base plate 73. Circular holes 90b and 91b formed through the base plate provide output passages from capacitors C and are aligned with symmetrically disposed square apertures 75 in each of the laminae superposed below lamina SS-72 which apertures bypass such output $\Delta P_o$ upward to lamina SS-72. The inner ends of channels 66 in lamina SS-72 are aligned with these apertures 75 and function to channel the gain block output $\Delta P_o$ (after it has passed through the stabilizing volumes) to a pair of symmetrical outer apertures 76 in laminae SS-13 which are aligned with apertures 76 associated with first (input) ends of the outer feedback fluidic resistors 80 ($R_f$) in lamina UHA-1. It should be understood that the output $\Delta P_o$ of my operational amplifier (which is also the output of my gain block) may also be obtained at the outputs of the stabilizing capacitors C with virtually no change in operating characteristics.

Each of the separator and resistor laminae superposed between the gain block and base plate 73 includes the same five equally spaced apertures 40 located on the centerline axis as provided on laminae SS-72, SS-02 and AM-2 in FIG. 4a. As will be noted hereinafter, only one of these five (power fluid supply) apertures will be utilized in the operational amplifier but the other four are also formed in these laminae for providing general type laminae useful in other circuit embodiments. Each of these separator and resistor laminae also includes four pairs of equally spaced square apertures symmetrical about the centerline axis, only the two pairs above-identified 74, 75 being utilized in the operational amplifier. Separator laminae SS-13, SS-14 and SS-11 each also include a pair of summing junction apertures 77a and 77b symmetrically disposed about the centerline axis. Finally, separator lamina SS-11 additionally includes two pairs of square apertures 76 and 78 symmetrically disposed about the centerline axis wherein apertures 76 are aligned with apertures 76 in laminae SS-13.

Referring now to the resistor laminae, resistor lamina UHA-1 further includes four matching fluidic resistors each comprising a very narrow capillary type passage 80 extending for a length of 1.25 inches and having a width of .005 inch. The UHA-1 resistor lamina is formed with the narrowest fluid flow resistance passages and each resistor is comprised of a single flow passage. It therefore provides the highest resistance of the several resistor laminae to be described hereinafter. The UHA-1 lamina may be of .002 or .004 inch thickness whereby each resistance passage provides 995 or 237 lb. second per inch resistance, respectively. All resistances herein cited are with air as the pressurized fluid medium at a temperature of 70°F. Due to the extreme narrowness of the resistance passages in lamina UHA-1, the resistance passages terminate in symmetrically disposed square aperture (76 and 78 at the input ends, and 79 at the output ends) for providing negligible fluid flow resistance in a vertical direction. Thus, apertures 79 provide a negligible resistance between the adjacent aligned summing junction apertures 77a and 77b in separator laminae SS-13 and SS-14. Resistance terminating apertures 78 are aligned with apertures 78 in lamina SS-11, but the inner resistors in lamina UHA-1 are not utilized in my operational amplifier when using lamina UHA-1 as the feedback resistor $R_f$ although they could be. The input resistor $R_i$ lamina UHA-4 has four equal resistance passage widths of .035 inch (and effective length of 1.25 inches) to provide an accordingly lower fluid flow resistance of 108 and 20.4 lb. sec./inch$^5$ for lamina thicknesses of .002 and .004 inch, respectively. Due to the substantially wider dimension of the resistance passages 81 in lamina UHA-4, no terminating apertures are required as in the case of the UHA-1 lamina. Resistance passages 81 have their input ends aligned with apertures 76, 78 in separator lamina SS-11 and their output ends aligned with summing junction apertures 77a, 77b in separator laminae SS-14 (and SS-11). Thus, the pairs of passages 81 nearest and farthest from the viewer of FIG. 5a have their second (output) ends aligned with summing junction apertures 77a and 77b, respectively.

The fluidic operational amplifier component shown in unassembled view in FIG. 5a may be supplied with a single differential control input signal $\Delta P_{iA}$ or may be utilized as a two-input summing operational amplifier and supplied with two differential input signals $\Delta P_{iA}$ and $\Delta P_{iB}$. In either event, the same number of laminae may be employed. The operation of my fluidic operational amplifier will now be described with reference to a single differential control input signal $\Delta P_{iA}$ 86 A being supplied thereto.

All of the input and output signals and power fluid are supplied to my operational amplifier through ports in the side of base plate 73. Thus, the power fluid is supplied through a port 92 connected by means of a drilled passage through base 73 to a hole 92a extending through the upper surface of base plate 73. Hole 92a is aligned with the centerline axis aperture 40 nearest the viewer in each of the superposed laminae from lamina SS-11 to SS-72 and thus provides the power fluid supply pressure directly to the fifth stage fluid amplifier in the gain block. In like manner, a first pair of control input signal ports 93 and 94 are formed on the side of base plate 73 opposite from the power fluid supply port 92 and by means of drilled passages the differentially pressurized control input signal $\Delta P_{iA}$ is supplied to holes 93a and 94a extending through the upper surface of the base plate in alignment with apertures 78 in separator lamina SS-11 and the input ends of the two inner input resistor passages 81 in lamina UHA-4. Thus, the control input signal $\Delta P_{iA}$ passes from input ports 93, 94 upward through apertures 78 in lamina SS-11 and then through the two inner resistance passages 81 in input resistor lamina UHA-4 due to the dead-ending effect of laminae SS-14. At the output ends of the two inner resistance passages 81, the signal then passes upward through the summing junction apertures 77a and 77b in separator laminae SS-14, resistance terminating apertures 79 in lamina UHA-1, summing junction apertures 77a and 77b in separator laminae SS-13, and finally through apertures 41 in the supply pressure manifold lamina SS-72 to be supplied to the first stage fluid amplifier as described with relation to FIG. 4a.

The amplified output $\Delta P_o$ from the gain block is supplied to the outer ends of channels 64 in supply pressure manifold lamina SS-72 and thence passes through such channels to the inner ends 64a thereof since separator laminae SS-13 dead-end the outer ends of channels 64. Output $\Delta P_o$ then passes downward through apertures 74 in laminae SS-13, UHA-1, SS-14, UHA-4 and SS-11 and into holes 90a, 91a in base plate 73. Holes 90a, 91a, being in respective communication with output ports 90 and 91 in the side of base plate 73, supply output $\Delta P_o$ thereto. Holes 90a, 91a also pass into the input of stabilizing volumes C connected to the bottom surface of base plate 73. Stabilizing volumes C are connected to the bottom of base plate 73 by any suitable means such as by forming grooves in the bottom surface of base plate 73 and soldering the open ends of volumes C within such grooves or, by passing a screw through the bottom of each volume upward through the bottom surface of the base plate. The output of the stabilizing capacitors (the feedback signal) passes upward through holes 90b, 91b in base plate 73, apertures 75 in laminae SS-11, UHA-4, SS-14, UHA-1 and SS-13 and finally into the inner ends of channels 66 in supply pressure manifold lamina SS-72. In lamina SS-72, the feedback signal passes to the outer ends of channels 66 and then downward through apertures 76 in laminae SS-13 and UHA-1. In lamina UHA-1, the feedback signal is dead-ended by laminae SS-14, and thus passes through the feedback resistors defined by outer passages 80. At the second (output) ends of the feedback resistors (in apertures 79) the feedback signal combines with the control input signal and pass upward through summing junction apertures 77a, 77b in laminae SS-13 and into the input of the gain block via apertures 41 in lamina SS-72. This completes the various paths traversed by the input, output and feedback signals and power fluid supply in my fluidic gain block component.

In the case of my operational amplifier being utilized as a two-input summing operational amplifier, a second differentially pressurized control input signal $\Delta P_{iB}$ is applied to ports 95 and 96 in the side of base plate 73, and as in the case of the first control input signal $\Delta P_{iA}$, suitable passages in the base plate transmit this second input signal to holes 95a, 96a extending through the upper surface of the base plate. Holes 95a, 96a are aligned with apertures 76 in separator lamina SS-11 and thus input signal $\Delta P_{iB}$ passes upward to the first ends of the outer pair of resistor passages 81 in lamina UHA-4. For the case wherein equal gain is desired for the two input signals, $\left(\dfrac{R_f}{R_{iA}}=\dfrac{R_f}{R_{iB}}\right)$, the width of all the resistor passages 81 are equal, as in the case of lamina UHA-4. The $\Delta P_{iB}$ signal at the second ends of input resistor passages 81 thence passes upward into summing junction apertures 77a and 77b in separator laminae SS-14 and continues on upward as described with reference to the first control input signal $\Delta P_{iA}$. Thus, summing junction apertures 77a, 77b in separator laminae SS-14 are the summing points for the two control input signals $\Delta P_{iA}$, $\Delta P_{iB}$ indicated as being summed in the FIG. 5c schematic diagram, and the summing (actually the negative feedback) of the feedback signal with the input signals is accomplished in summing junction apertures 77a, 77b in separator lamina SS-13. In the case wherein a fluid signal passes horizontally in a separator lamina, such as in the summing junction apertures 77a, 77b in separator laminae SS-13 and SS-14, the height of such apertures (channels) should be sufficient to prevent the channel from becoming an effective orifice and contributing additional resistance. Thus, the summing junction apertures are made negligibly resistive to fluid flow by stacking three of such laminae together, as illustrated. All of the laminae are of .004 inch thickness except that the resistor laminae are also available in .002 inch thickness to obtain a greater variety of resistance values.

Figure 5C:
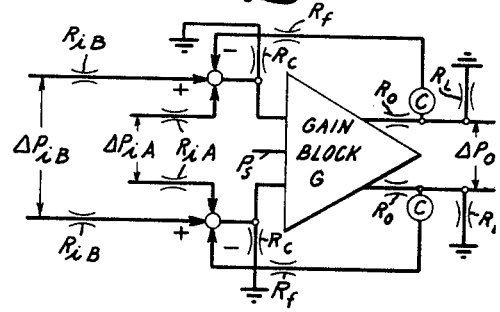
Figure 5D:
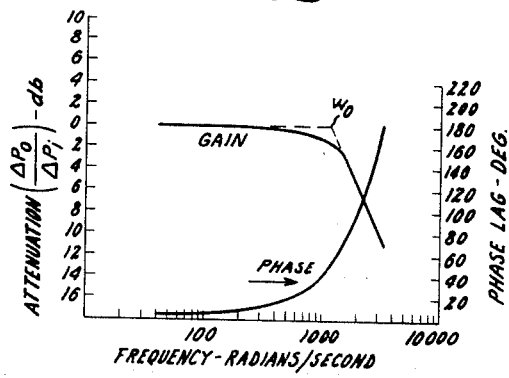
Figure 5F:
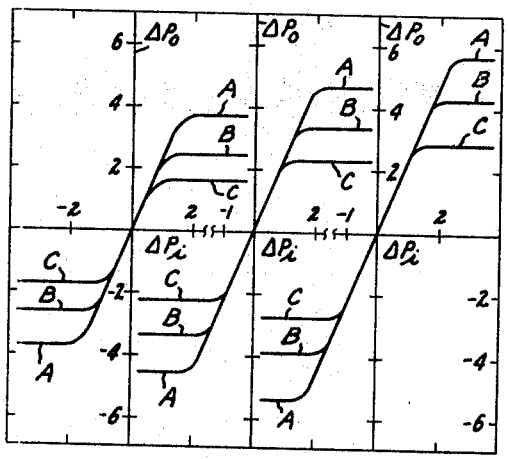
FIGS. 5e, 5f and 5g illustrate various alternate fluidic resistor laminae and gain characteristics of my operational amplifier.
Figure 5G:
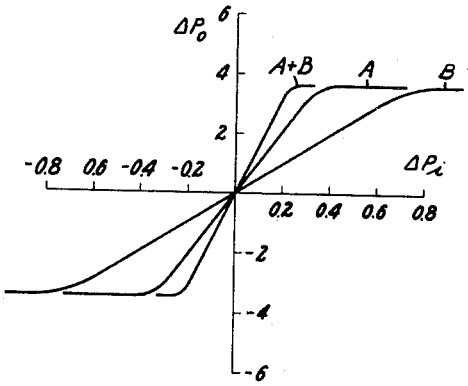
Figure 5E:
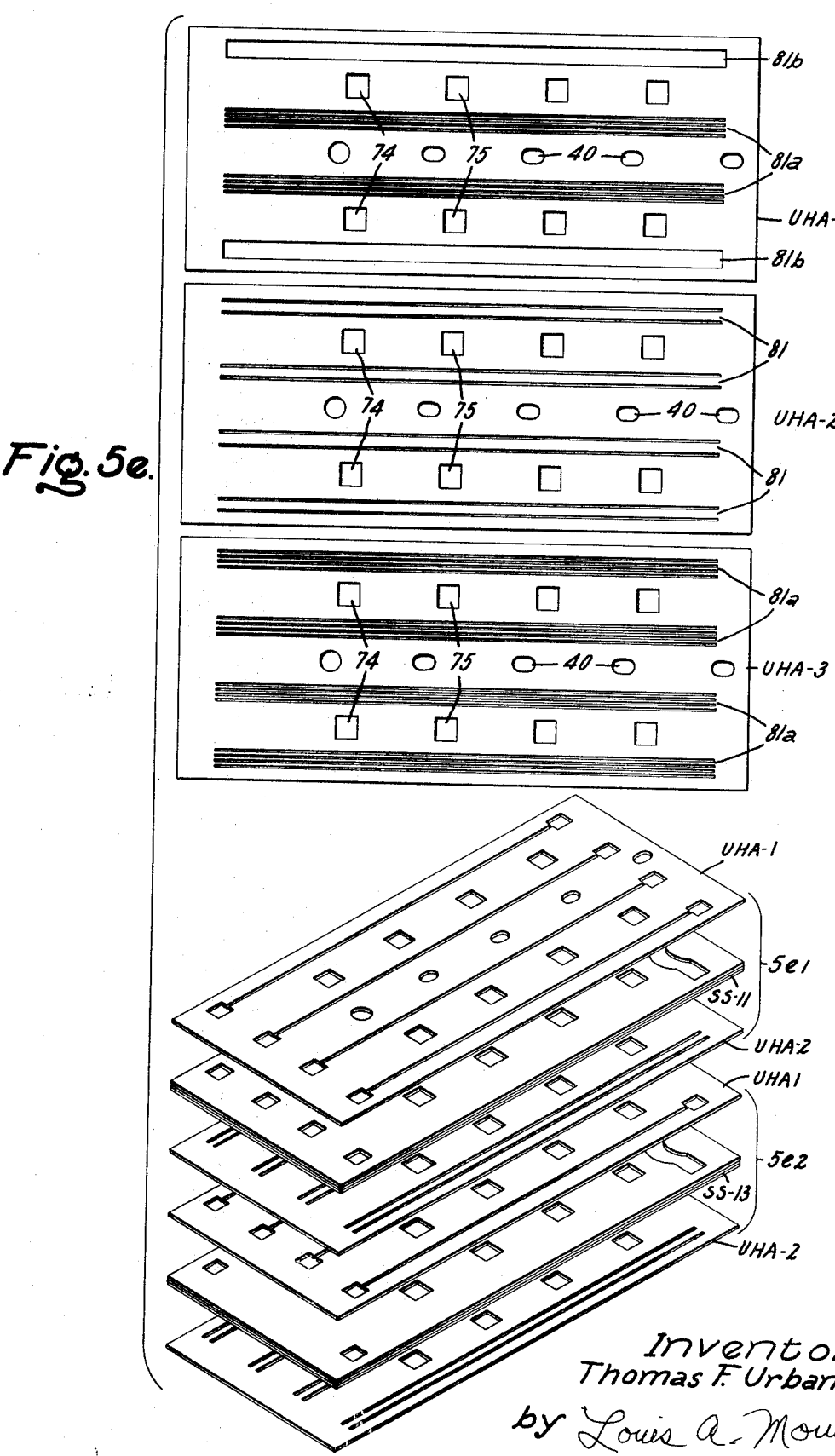

In the case wherein different gains are to be provided for two control input signals, $\left(\dfrac{R_f}{R_{iA}}\neq\dfrac{R_f}{R_{iB}}\right)$, a resistor lemina such as the UHA-6 illustrated in FIG. 5e may be substituted for the UHA-4 to provide input resistors $R_{iA}$ and $R_{iB}$ having unequal resistance values. In particular, lamina UHA-6 comprises four paralleled passages 81a each of .005 inch width and 1.25 inch effective length for each of the two inner resistors $R_{iA}$, and single passages 81b each of .050 inch width for the two outer resistors $R_{iB}$. The resistance of the paralleled four .005 inch width passages ($R_{iA}$) is 328 and $56\dfrac{\text{lb. sec.}}{\text{in.}^5}$ for lamina thickness of .002 and .004 inch, respectively. The resistance of each .050 inch passage ($R_{iB}$) is 75.6 and $14\dfrac{\text{lb. sec.}}{\text{in.}^5}$ for lamina thickness of .002 and .004 inch, respectively. Also, all the resistance passages have a length of approximately 1.25 inches when utilizing terminating apertures (UHA-1) and an effective length (considering the end portions as terminating apertures) of approximately 1.25 inches when not utilizing terminating apertures (UHA-4, UHA-6). Finally, it should be understood that all of the fluidic resistors in the UHA-X series of laminae and the supply pressure dropping resistor in the supply pressure manifold are linear resistors, the laminar flow obtained through the resistor passages being linearly proportional to the difference in pressure across each passage.

Lamina UHA-2 in FIG. 5e illustrates yet another type of fluidic resistor lamina having four equal resistance values wherein each resistor consists of two paralleled passages 81 each of .005 inch width to provide resistance values of 545 and $93 \frac{\text{lb. sec.}}{\text{in.}^5}$ for lamina thickness of .002 and .004 inch, respectively. A fifth type of resistor lamina, having four equal resistance values, the UHA-3, is also illustrated in FIG. 5e. Each resistor consists of four paralleled passages 81a each .0005 inch width, i.e., the same passages as 81a HT in lamina UHA-6 and thus having the same resistance values. Obviously, many other types of resistor laminae, having equal resistance values (such as the UHA-1, 2, 3 and 4) or unequal resistances (such as the UHA-6) may be fabricated merely by changing the width and, or number of paralleled passages.

It should be evident that a predetermined value of feedback $R_f$ and input $R_i$ resistance can also be obtained by paralleling or serially connecting one or more particular equal resistance value resistor laminae of the UHA-X type to obtain the desired value of resistance. In such case, as illustrated in FIG. 5e1, the resistors in laminae UHA-1 and UHA-2 are isolated and paralleled by means of a separator lamina SS-11 (or more than one SS-11 lamina for obtaining negligible resistance in the summing junction apertures) for equal gains for the two control input signals. If the gains are to be unequal, the separator laminae between the two paralleled resistor laminae are of the SS-13 type as illustrated in FIG. 5e2 wherein the outer resistance passages are paralleled by means of outer apertures 76 in laminae SS-13 but the inner passages in upper lamina UHA-1 are dead-ended since the SS-13 do not have inner apertures 78 as do laminae SS-11. Thus input control signal $\Delta P_{iA}$ is caused to flow only through the inner resistance passages of lamina UHA-2 whereas signal $\Delta P_{iB}$ is caused to flow through the paralleled combination of the outer resistance passages in laminae UHA-2 and UHA-1. Obviously, many other combinations of two or more paralleled (or series) resistor laminates may be utilized to obtain particular resistance values. For purposes of simplicity, the feedback and input resistor laminae are illustrated in each fluidic component hereinafter as being of the UHA-1 and UHA-4 type, respectively. Obviously, other laminae hereinabove described are utilized to obtain a desired closed loop gain $\frac{R_f}{R_i}$ for the operational amplifier portion of the particular fluidic component.

FIG. 5b illustrates a perspective view of the assembled operational amplifier indicating its compactness and ease of connection to external conduits or tubing for the control input signals, output, and supply pressure. The ports in base plate 73 may be internally threaded, if desired, for utilizing a screw type of external conduit connection. The bottom face of base plate 73 is provided with suitable means, as described hereinabove, for connecting the stabilizing fluidic capacitors C thereto. Capacitors C comprise fixed volumes such as metallic cans of rectangular cross section each having an open end which fits against the bottom face of the base plate. Stainless steel (and obviously other metals also) has been found to be satisfactory for use as the material for the stabilizing volumes which are of size generally in the range 0.10 to 0.50 cubic inches. The twelve screw holes drilled through the laminae for retaining the elements in fluid tight communication are also formed into the top face of base plate 73 for fluid tight communication therewith. The operational amplifier described in FIG. 5a has the following dimensions, after assembly, base plate 73 has a diameter of 2 ⅛ inch, and the overall height dimension of the component from the bottom of stabilizing volumes C to the top of the gain block is 1 ¾ inch.

FIG. 5c is a schematic diagram of my fluidic operational amplifier component wherein the element designated gain block is identical to the gain block represented schematically in FIG. 4c. A first differential pressurized control input signal $\Delta P_{iA}$ is supplied to a first pair of input terminals corresponding to ports 93, 94 in base plate 73 and this signal passes through input resistors $R_{iA}$ corresponding to the inner passages in the UHA-4 lamina in FIG. 5a. In like manner, a second control input signal $\Delta P_{iB}$ is supplied to a second pair of input terminals corresponding to ports 95, 96 in the base plate and passes through input resistors $R_{iB}$ corresponding to the outer passages in the UHA-4 lamina. The output of the gain block $\Delta P_o$ is also the output of the operational amplifier and is provided at the output terminals corresponding to ports 90, 91 in the base plate. The stabilizing volumes (fluidic capacitors C) and feedback resistors $R_f$ are connected in negative feedback relationship to the summing junction due to an odd number of serially connected fluid amplifiers in the gain block. As previously noted, capacitors C may be connected in the forward circuit between the output of the gain block and the junctures of the output and feedback networks, or between such junctures and the output ports.

FIG. 5d illustrates a closed loop Bode diagram representation of the frequency response of a particular operational amplifier constructed in accordance with my invention and having a closed loop $\left(\frac{\Delta P_o}{\Delta P_i}\right)$ gain of 1.0, an open loop (GH) gain of 20, a load at the output of the operational amplifier comprising 0.016 inch diameter orifices and a power fluid supply pressure of 10 p.s.i.g. Consistent with conventional Bode diagram representation, the gain scale is in terms of decibles, the phase lag scale in terms of degrees and the frequency scale in terms of radians per second. The frequency response of this typical operational amplifier is excellent as evidenced by the break frequency $\omega_o$ occurring beyond 1,000 radians per second. It indicates that the operational amplifier provides its fixed gain $R_f/R_i$ characteristic (i.e., no attenuation) with negligible phase lag over a wide range of input signals.

FIG. 5f illustrates the gain characteristics of my operational amplifier under various loads and supply pressures. The curves designated A are for blocked load (i.e., no load) conditions, curves B are for a load comprising 0.016 inch diameter orifices, and curves C are for a load comprising 0.020 inch diameter orfices. The three curves to the left are for a power fluid supply pressure of 8 p.s.i.g., the center curves for supply pressure of 10 p.s.i.g., and the curves to the right for supply pressure of 12 p.s.i.g. (air at a temperature of 68°F.).

FIG. 5g illustrates the gain characteristics of the operational amplifier when used as a summer for two control input signals $\Delta P_{iA}$ and $\Delta P_{iB}$ and having different gains for each input circuit. The characteristics are for a load comprising 0.016 inch diameter orifices and a supply pressure of 10 p.s.i.g. Gain curves are indicated for the condition when utilizing only a single input signal A and a gain of 10, a single input B and a gain of 5, and the sum of signals A + B having the different gains 10 and 5, respectively.

My operational amplifier is thus seen to be a combination of my active element gain block with passive element input and feedback resistors and stabilizing capacitors integrally packaged in a closed loop circuit. Due to the high gain of the gain block component, the operational amplifier has a substantially fixed gain regardless of changes in gain of the gain block. The above characteristic curves indicate that the operational amplifier has excellent frequency response and saturation characteristics and a fixed linear gain independent of variations in load and supply pressures as indicated by the slope of the unsaturated gain characteristics in FIG. 5f. When used as a summing amplifier, the control input signals are amplified in accordance with the equation $$\Delta P_o = \frac{R_f}{R_{iA}} \Delta P_{iA} + \frac{R_f}{R_{iB}} \Delta P_{iB}$$

it being understood that summing includes the difference of two signals. The operational amplifier may also be used as a signal limiter since the gain characteristics are flat (at saturation levels) and provides a stable saturation. Closed loop gains up to the forward gain may be obtained with my five-stage operational amplifier and a minimum signal-to-noise ratio of 200:1 over a frequency range of 0 to 100 hertz is readily obtained. My operational amplifier has a very linear output pressure range wherein the output pressure ($\Delta P_o$) varies linearly with input signal pressure at outputs of up to ±15 p.s.i. for an input power fluid supply pressure of 30 p.s.i.g. Finally, the operational amplifier has a very high input impedance and an essentially zero output impedance such that it is suitable as an isolation amplifier.

The second extension of my fluidic gain block component and also of my operational amplifier component are their utilization in a frequency responsive circuit which provides the mathematical computation of integration over a relatively wide frequency range of input signals. My fluidic integrator component is essentially my operational amplifier and the addition of a polarity reverser for providing a positive feedback network including fluid flow impedance (a feedback resistor and integrating capacitor). Referring to FIG. 6a, there is illustrated my integrator in unassembled form wherein the various laminae are superposed in their proper order prior to assembly. The common elements of my operational amplifier and integrator are, reading from top to bottom, the gain block, separator laminae SS-13 and negative feedback resistor ($-R_f$) lamina UHA-1, and, reading from bottom to top, stabilizing volumes (capacitors) $C_s$, base plate 100, separator lamina SS-11, input resistor ($R_i$) lamina UHA-4 and separator lamina SS-14, these two groups of laminae corresponding to all the laminae in the operational amplifier. The distinctions between the operational amplifier and integrator are the addition of the following laminae in the order cited, a polarity reverser component superposed directly beneath the negative feedback resistor ($-R_f$) lamina UHA-1, a positive feedback ($+R_f$) lamina UHA-1, and resistor separating laminae SS-17, and integrating volumes $C_i$ connected to the bottom face of base plate 100.

Figure 6B:
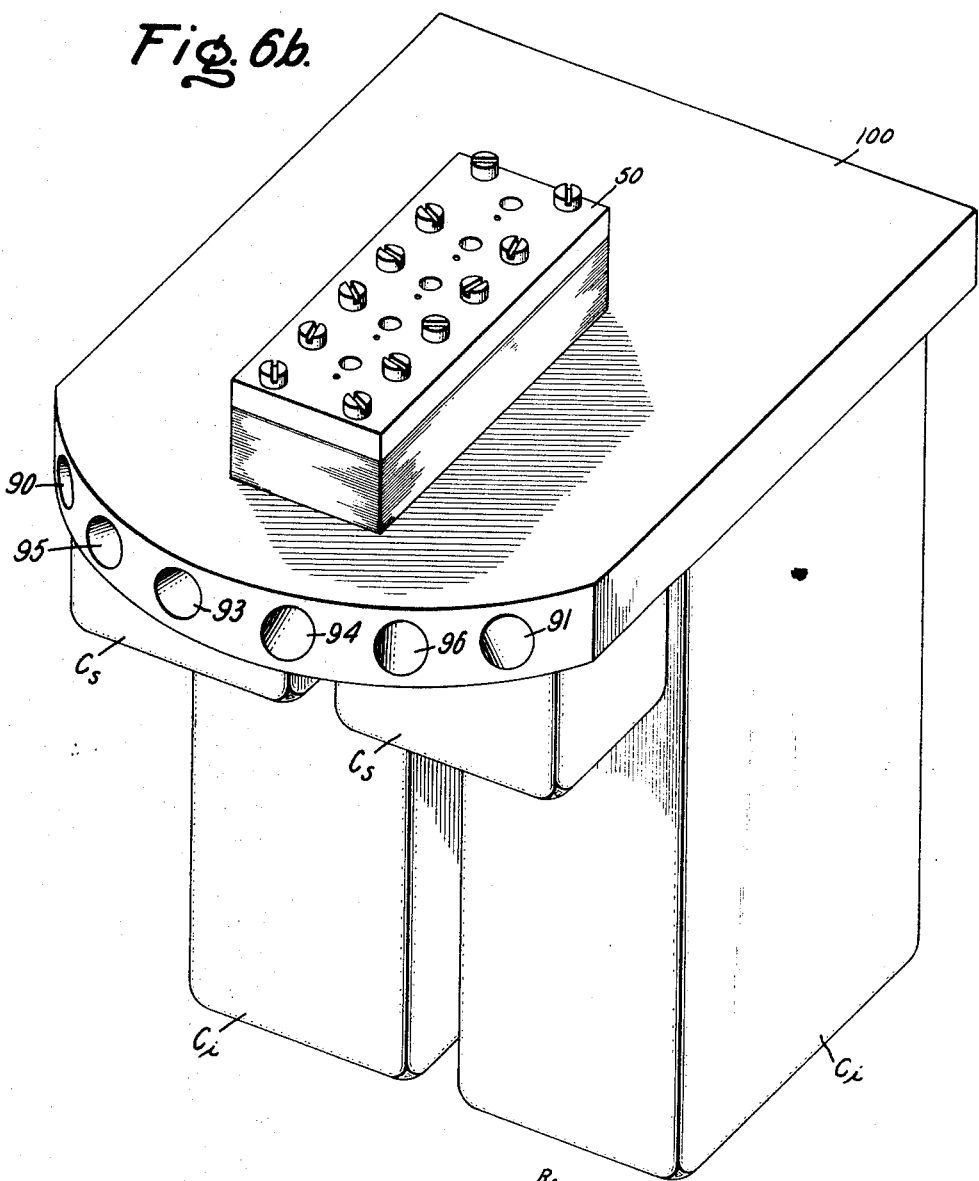
Figure 6C:
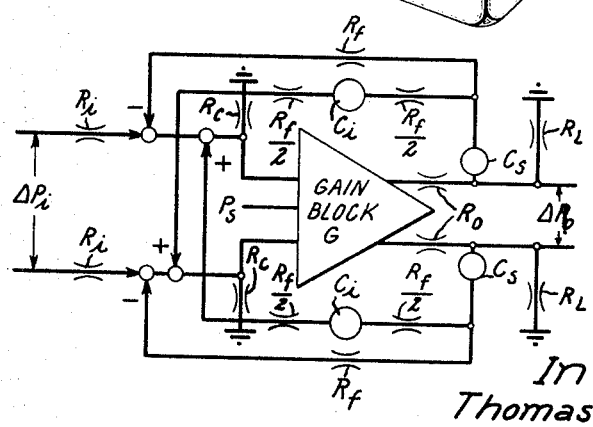

Reference to the schematic representation of my positive and negative feedback integrator in FIG. 6c may aid in better understanding the operation of my integrator and the purpose of the various laminae in FIG. 6a. In particular, the polarity reverser component comprising in the order cited from top to bottom, lamina SS-14, laminae SS-15, lamina SS-13, laminae SS-15 reversed, and lamina SS-13, causes the feedback signal in passing upward from the output of the stabilizing capacitors $C_s$ (holes 90b, 91b in base plate 100) through apertures 75 in the various laminae to become reversed in polarity when passing through the crossover channels 101 in the SS-15 laminae. The corner ends of channels 101 are dead-ended in an upward direction by spacer lamina SS-14 and thus the (now reversed polarity) positive feedback signal is caused to flow through the outer positive feedback resistance passages 102 in ($+R_f$) lamina UHA-1. The negative feedback signal continues upward through apertures 75 in laminae SS-14, UHA-1 and SS-13 as in the manner of the operational amplifier. As indicated in the schematic diagram of FIG. 6c, the resistor ($+R_f$) in the positive feedback circuit is separated into two equal resistance portions having the integrating volume (capacitor $C_i$) interposed therebetween. This apportioning of the positive feedback resistor is accomplished by utilizing resistor-separating laminae SS-17 which have formed therein wide apertures 69a aligned with apertures 69 in the various laminae, apertures 69 being dead-ended in an upward direction by lamina SS-02 in the gain block as illustrated in FIG. 4a. Apertures 69a are of width sufficient to overlap the outer resistance passages in the adjacent UHA-1 lamina. Thus, the positive feedback signal in passing through outer resistance passages 102 in ($+R_f$) lamina UHA-1 (from left to right as seen by the viewer) is diverted by apertures 69a in laminae SS-17 downward through apertures 69 in laminae SS-14, UHA-4, SS-11, through the base plate holes 103 and 104 into the integrating volumes $C_i$, and thence upward through the same paths to ($+R_f$) lamina UHA-1, to the output (right) ends of resistor passages 102, and thence upward through the summing junction apertures for positive feedback summation with the control input signal $\Delta P_i$ in the summing junction apertures of the SS-13 lamina interposed between ($+R_f$) lamina UHA-1 and reversed lamina SS-15. The control input signal $\Delta P_i$ and the positive feedback signal are appropriately summed with the negative feedback signal in the summing junction apertures of the laminae SS-13 interposed between laminae SS-72 and ($-R_f$) lamina UHA-1. It should be noted that the integrating volume $C_i$ is provided with a common input-output as distinguished from the stabilizing capacitor $C_s$. The polarity reverser component utilizes three SS-15 laminae for reversing the polarity of one side of the differential feedback signal (which is virtually identical with integrator output $\Delta P_o$) and three SS-15 laminae stacked in reverse for reversing the polarity of the other side of the signal in order to have negligible resistance in channels 101. In all other respects, the integrator utilizes the same laminae as the operational amplifier, and for the same purposes. The integrator structure has been described with reference to only one differentially pressurized control input signal $\Delta P_i$ applied to input ports 93 and 94 (or 95 and 96) in base plate 100 and it should be evident that a second control input signal may also be utilized as in the case of the operational amplifier.

FIG. 6b illustrates a perspective view of the assembled integrator component indicating its compactness and ease of connection to external conduits or tubing for the control input signals, output and supply pressure. The integrator described in FIG. 6a has the following dimensions after assembly, base plate 100 has a width of 2 5/16 inch and maximum length of 3 ¼ inch, and an overall height dimension from the bottom of the integrating volumes $C_i$ to the top of the gain block of approximately 3 ¾ inch. The dimension from the top of the gain block to the bottom of the base plate is approximately three-fourths inch. The bottom face of base plate 100 is provided with suitable means for connecting the stabilizing capacitors $C_s$ and integrating capacitors $C_i$ thereto. The stabilizing volumes are of the size comparable to the size thereof in the operational amplifier. The integrating volumes are considerably larger and are generally in the range of 1.0 to 3.0 cubic inches. As one example of a means of connecting the capacitors to the base plate, stabilizing capacitors $C_s$ have their open ends fitted into grooves within the bottom face of the base plate and a long screw passes upward through the bottom-most end of each fixed volume and is threaded into the bottom portion of the base plate. The integrating capacitors $C_i$ may also be connected to the base plate in this manner, however, in a particular embodiment, depressions are formed within the bottom surface of the base plate over the entire area covered by the open end of the fixed volumes and the capacitor open ends are fitted within the depressions and the capacitors retained in fluid tight communication therewith by means of a screw threaded up into the base plate as in the case of the stabilizing capacitors. As indicated in the base plate 100 element in FIG. 6a and the schematic of FIG. 6c, the output of the gain block is also the output $\Delta P_o$ of the integrator although the stabilizing volumes $C_s$ may be connected at various points adjacent the output with no practical change in operating characteristics.

The integration action of my fluidic integrator component is accomplished by means of a delayed (resistor-capacitor) positive feedback circuit connecting the output of an operational amplifier to the input summing junction. Equal amounts of positive and negative feedback are employed (the magnitude of $+R_f$ = the magnitude of $-R_f$). Positive feedback alone can provide an integrating function, however, the performance of a purely positive feedback device is critically dependent on the loop gain and any change thereof drastically affects the performance. Thus, a positive feedback lag circuit is employed with my (negative feedback) operational amplifier to thereby avoid the critical dependency on loop gain and thus provide reliable performance.

The transfer function for my integrator is the expression $$\frac{\Delta P_o}{\Delta P_i} = \frac{R_f}{R_i} \frac{GH(1+\tau_2 s)}{[(1+\tau_1 s)(1+\tau_2 s) + GH\tau_2 s]}$$

where $\tau_2 = \frac{R_f C_i}{4}$ is the natural integrating time constant which is multiplied by $(1+GH)$ to obtain the actual integrating time constant, GH is the d-c loop gain, and $\tau_1$ is the stabilizing time constant. It should be noted that $\tau_2$ is in the positive feedback path where $R_f$ is relatively large, and thus for a given value of capacitance $C_i$, $\tau_2$ is relatively large. Since GH is generally much greater than 1.0, the transfer function can be represented as a lag-lead-lag type wherein the first lag break frequency is inversely proportional to the integrating time constant, i.e., $\dfrac{1}{(1+GH)\tau_2}$, the lead break is inversely proportional to the natural integrating time constant, i.e., $\dfrac{1}{\tau_2}$, and the second lag break is inversely proportional to the stabilizing time constant, i.e., $\dfrac{1+GH}{\tau_1}$. Since the stabilizing time constant $\tau_1$ is generally much smaller than $\tau_2$, it may be ignored for practical considerations, and the transfer function reduces to $$\frac{\Delta P_o}{\Delta P_i} = \frac{K\tau_2(1+\tau_1 s)}{(1+\tau_2 s)}$$

over the frequency range of interest where $\tau_2$ is now the integrating time constant (which was $\tau_2$ in the generalized transfer function), $\tau_1$ the lead or natural integrating time constant, K is the integrating rate $K = \dfrac{R_f}{R_i \tau_2}$, and $\tau_2 \cong GH\tau_1$. The latter transfer function is approximately equal to $$\frac{\Delta P_o}{\Delta P_i} \cong \frac{K}{S}(1+\tau_1 s)$$

for the usual condition where $\tau_2$ is much greater than 1.0. This latter approximated transfer function evidently provides integration $\left(\text{due to } \dfrac{K}{S}\right)$ plus a lead $(1+\tau_1 s)$. As in the case of the operational amplifier, the a-c open loop gain GH must be reduced to unity before the closed loop accumulates 180° of phase shift and the stabilizing network including capacitor $C_s$ accomplishes this as in the case of the operational amplifier.

Figure 6D:
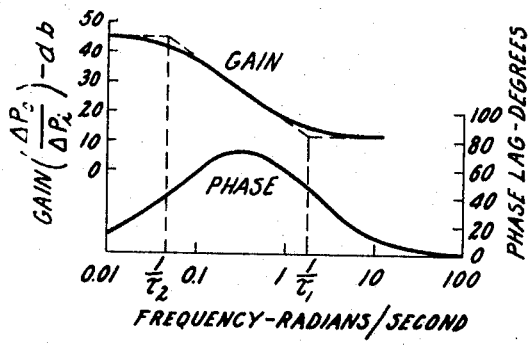
FIGS. 6d and 6e illustrate frequency response and step input characteristics, respectively, of my integrator.
Figure 6E:
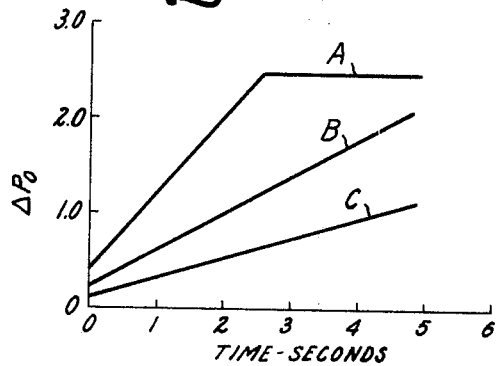

FIG. 6d illustrates a closed loop Bode diagram representation of the frequency response (transfer function)

$$\frac{\Delta P_o}{\Delta P_i} = \frac{K\tau_2(1+\tau_1 s)}{(1+\tau_2 s)}$$

of a typical integrator constructed in accordance with my invention and especially indicates the relatively wide frequency spacing $\left(\dfrac{1}{\tau_2} - \dfrac{1}{\tau_1}\right)$ between the lag (integrating) time constant $\tau_2$ and the lead time constant $\tau_1$. The stabilizing lag time constant, being at a high frequency of perhaps 1,000 radians per second as in the case of the operational amplifier, is not illustrated in FIG. 6d. The specific transfer function depicted in the Bode diagram is $$\frac{\Delta P_o}{\Delta P_i} = \frac{200(1+0.5s)}{(1+25s)}$$

such that $\tau_2 = 25$ seconds $\left(\dfrac{1}{\tau_2} = 0.04\right)$, $\tau_1 = 0.5$ second $\left(\dfrac{1}{\tau_1} = 2.0\right)$ and $K = \dfrac{200}{\tau_2} = 8.0$ Finally, FIG. 6e illustrates the time response characteristics of my integrator circuit to a step input signal wherein the integrator has the specific transfer function indicated in the FIG. 6d Bode diagram, which is approximated to $$\frac{\Delta P_o}{\Delta P_i} = \frac{K}{S}(1+\tau_1 s) = \frac{8}{s}+4$$

Thus, the illustrated step input responses are for an integration rate of 8 p.s.i./p.s.i.-sec. and a proportional gain of 4.0. Curve A is for a step input signal having a magnitude of $\Delta P_i = 0.1$ p.s.i., curve B for a step input magnitude of 0.05 p.s.i., and curve C for a step input magnitude of 0.025 p.s.i. The flat portion on curve A indicates the amplifier saturation.

In summation, my fluidic integrator component provides a basic building block for both closed loop control and open loop computational systems. The integrator accomplishes integration of rate signals for computational purposes and a reset control action in closed loop systems to reduce control error signals to zero. The integrator may also be utilized as a frequency shaping component for compensating and stabilizing closed loop control systems. A wide range (1 to 20 p.s.i./p.s.i.-sec.) of integration rates are easily obtained to satisfy specific system requirements. Integrating (lag) time constants up to 60 seconds are readily obtained. Neither the integration rate range or integrating time constants herein recited is to be considered a limitation thereof since they can be further increased by increasing the resistance value of $R_f$ or the capacitance value of $C_i$. My integrator (and other components to be described hereinafter) features very low drift and is insensitive to power fluid supply pressure changes due to the fixed gain of the operational amplifier element thereof.

Figure 7B:
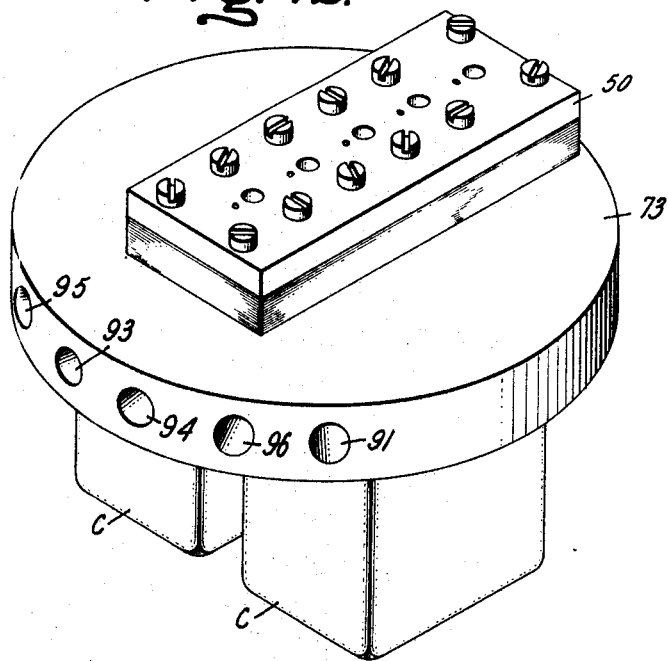
Figure 7E:
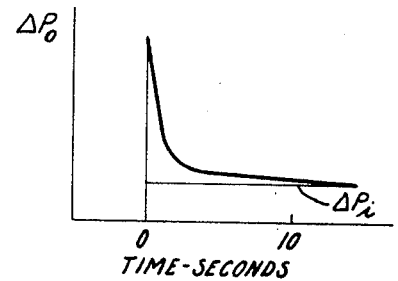
FIGS. 7d and 7e illustrate frequency response and step input characteristics, respectively, of my lead-lag.
Figure 7D:
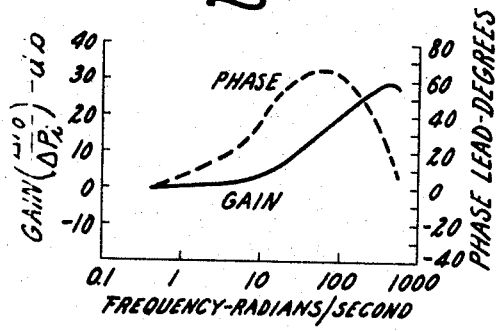
Figure 7C:
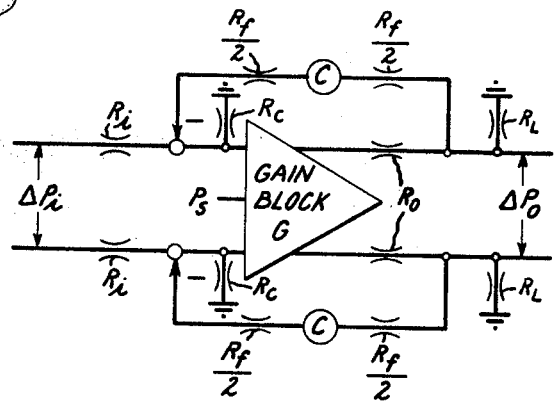

Another frequency-responsive circuit constructed in accordance with my invention is the lead-lag circuit illustrated in unassembled view in FIG. 7a and schematically in FIG. 7c. Whereas the integrator circuit of FIG. 6a provides a widely spaced lag-lead type of transfer function, the lead-lag provides a derivative action which in typical analog fluidic control systems provides a phase lead for cancelling or reducing unwanted phase lags. The lead-lag circuit frequency response is illustrated in the Bode diagram representation of FIG. 7d which, analogous to the integrator circuit, provides a differentiator action in the frequency range between the lead time constant (upbreak) and the lag time constant (down break) on the gain versus frequency curve. Thus, the lead-lag circuit may also be used for differentiation computation purposes over a particular frequency range of control input signals. My lead-lag component is essentially my operational amplifier with the addition of a capacitor C connected at the midpoint of the feedback resistor $R_f$. It should be especially noted that no stabilizing capacitors are required in the lead-lag component (due to its phase lead characteristics).

Referring to FIG. 7a, there is illustrated my lead-lag component in unassembled form wherein the various laminae are superposed in proper order prior to assembly. The common elements of my operational amplifier and lead-lag component are, reading from top to bottom, the gain block, three separator laminae (of the SS-12 rather than SS-13type), feedback resistor $R_f$ lamina UHA-1, and reading from bottom to top, base plate 73, separator lamina SS-11, input resistor $R_i$ lamina UHA-4 and separator laminae SS-14. All of these laminae just recited (with the exception of separator laminae SS-12 substituted for SS-13) represent all the laminae in the operational amplifier in FIG. 5a. The distinctions between the operational amplifier and my lead-lag component (other than the substitution of the SS-12 laminae), is the addition of resistor-separating laminae SS-42 interposed between feedback resistor $R_f$ lamina UHA-1 and separator laminae SS-14, and the fact that holes 90a and 91a in base plate 73 do not pass to the bottom side of the base plate but are merely interconnected to the output ports 90 and 91, respectively. Further, no stabilizing capacitors are used in my lead-lag circuit but capacitors C having volumes of the order of the volumes of the stabilizing capacitors are utilized to directly establish the lead time constant and indirectly the lag time constant.

Reference to the schematic representation of my fluidic lead-lag component in FIG. 7c may aid in better understanding the operation of my lead-lag and the purpose of the various laminae in FIG. 7a. In particular, the lead-lag output $\Delta P_o$, which corresponds to the gain block output, is transmitted from the output of the gain block through channels 64 in laminae SS-72 downward through aligned apertures 78 in separator laminae SS-12 to the apertures 78 of the inner resistance passages in feedback resistor $R_f$ lamina UHA-1. The negative feedback signal then passes through inner resistance passages 80 to the midpoint thereof at which point the angularly disposed wide apertures 110 in resistor-separating laminae SS-42 (which overlap resistance passages 80 and apertures 75 in the various laminae) divert the negative feedback signal downward through apertures 75 in laminae SS-14, UHA-4, SS-11, through base plate holes 90b and 91b into the volumes C and then upward through the same paths to the feedback resistor $R_f$ lamina UHA-1, to the output (right) ends of inner resistor passages 80, and thence upward to the summing junction apertures 77a, 77b for negative feedback summation with the control input signal $\Delta P_i$ in the SS-12 laminae. The output signal $\Delta P_o$ also passes downward from the ends 64a of channels 64 in laminae SS-72 through aligned apertures 74 in the various laminae and through holes 90a and 91a in base plate 73 which are connected by suitable passages therein to output ports 90 and 91, respectively. In all other respects, the lead-lag utilizes the same laminae as the operational amplifier, and for the same purposes, and therefore any detailed description of the fluid flow paths for the control input signal will be omitted. It should be sufficient to state that the control input signal may be applied across ports 93—94 or 95—96 in the base plate.

FIG. 7b illustrates a perspective view of the assembled lead-lag component indicating its compactness and ease of connection to external conduits or tubing. The lead-lag described in FIG. 7a may have the same dimensions after assembly as the operational amplifier. Thus, in one particular embodiment of my fluidic lead-lag component, base plate 73 has the diameter of 2 ⅛ inch and the component has an over-all height of 1 ¾ inch.

The transfer function for my lead-lag is the expression $$\frac{\Delta P_o}{\Delta P_i} = \frac{R_f}{R_i} \left( \frac{GH}{1+GH} \right) \left( \frac{1+\tau s}{1+\tau s/(1+GH)} \right)$$

where $\tau$ is the lead time constant and is approximately equal to $\frac{R_f C}{4}$ and GH is d-c loop gain. It is evident from the transfer function that the lag time constant is $\frac{\tau}{1+GH}$ and since GH is generally much greater than 1, the spacing between the lead and lag time constants can be varied to a great extent. Further, since the natural time constant $\tau$ is dependent on the resistance and capacitance values of R/C, the lead time constant is thus established by proper choice of such values.

Since the d-c loop gain GH is generally considerably greater than 1, the transfer function for the lead-lag component may be more simply expressed as $$\frac{\Delta P_o}{\Delta P_i} = \frac{R_f}{R_i} \frac{(1+\tau_1 s)}{(1+\tau_2 s)}$$

where the lag time constant $\tau_2$ equals $\frac{\tau_1}{1+GH}$

FIG. 7d illustrates a closed loop Bode diagram representation of the frequency response of a typical lead-lag constructed in accordance with my invention and indicates the frequency spacing $\left(\frac{1}{\tau_1} - \frac{1}{\tau_2}\right)$ between the lead (differentiating) time constant $\tau_1$ and the lag time constant $\tau_2$. The phase versus frequency plot is especially noteworthy since it indicates the phase lead characteristics of the lead-lag circuit as opposed to the phase lag of the integrator hereinabove described.

FIG. 7e illustrates the time response of the lead-lag to a step input signal $\Delta P_i$. This time response indicates the differentiator action of the lead-lag circuit since the output $\Delta P_o$ initially rises to a sharp peak and immediately begins to decrease and ultimately decays to a magnitude of the input signal.

In summation, my fluidic lead-lag component provides a dynamic frequency shaping network for use in fluidic control and sensing systems. The lead-lag accomplishes differentiation for computational purposes over a frequency range determined by $\frac{1}{\tau_1}$ and $\frac{1}{\tau_2}$. Lead time constants of 10 seconds are readily obtained and are not to be construed as an upper limit thereof since larger capacitor volumes and, or higher resistance values of $R_f$ may be utilized to increase the lead time constant. The lag time constant $\tau_2 = \frac{\tau_1}{1+GH}$ and thus is dependent on the value of open loop gain GH. In one particular embodiment, a value of GH of 9 was utilized such that $\tau_2 = 1/10\tau_1$ but this is not to be construed as a limitation thereof. As in the case of all the other fluidic components herein described, my lead-lag provides a very linear output pressure range of up to ±5 p.s.i. for power fluid supply pressures of up to 30 p.s.i.g.

Figure 8A:
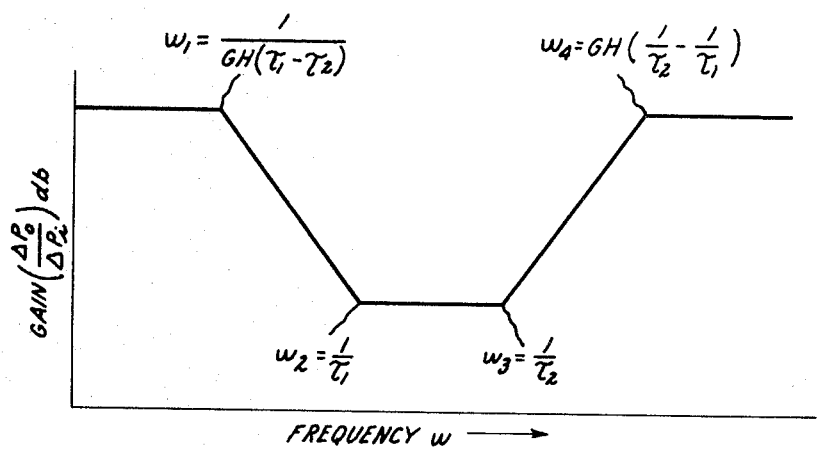
FIGS. 8a and 8b illustrate frequency response and schematic views, respectively, of my fluidic notch frequency-responsive component.

Obviously there are many more frequency-responsive fluidic components that may be constructed with the laminated operational amplifier approach which is the basic building block for the various components herein described. As one additional example, a dynamic frequency shaping network known as the "notch" finds frequent use in control systems. The frequency response of the notch component is indicated in the Bode diagram representation of FIG. 8a and comprises a first lag break $\omega_1$, a first lead break $\omega_2$, a second lead break $\omega_3$ and a second lag break $\omega_4$, these various lag and lead breaks occurring with increasing frequency, $\omega$, of the control input signal. Obviously, the notch frequency response can be obtained by combining the lag-lead frequency response of my integrator (see FIG. 6d) with the lead-lag frequency response of my lead-lag (see FIG.d). However, this would require an interconnection of two separate components thereby avoiding the compactness which is one of the features of my invention. A single circuit which obtains the notch frequency response is illustrated schematically in FIG. 8b wherein a first capacitor $C_1$ is connected at the midpoint of a positive feedback resistor $R_f$, and a second capacitor $C_2$ is connected at the midpoint of a negative feedback resistor $R_f$. Note that the feedback resistor values $R_f$ are equal in both the positive and negative feedback loops. The natural time constant $\tau_1$ of the positive feedback loop is $\tau_1 = \frac{R_f C_1}{4}$ and the natural time constant $\tau_2$ of the negative feedback loop is $\tau_2 = \frac{R_f C_2}{4}$ In the closed loop Bode diagram representation of the notch, the first lead break or up-break occurs at a frequency $\omega_2 = \frac{1}{\tau_1}$ and the second lead break at a frequency $\omega_3 = \frac{1}{\tau_2}$ The first lag break occurs at a frequency $\omega_1 = \frac{1}{GH(\tau_1 - \tau_2)}$ and the second lag break at $\omega_4 = GH \left( \frac{1}{\tau_2} - \frac{1}{\tau_1} \right)$ wherein GH is the d-c open loop gain.

Figure 8B:
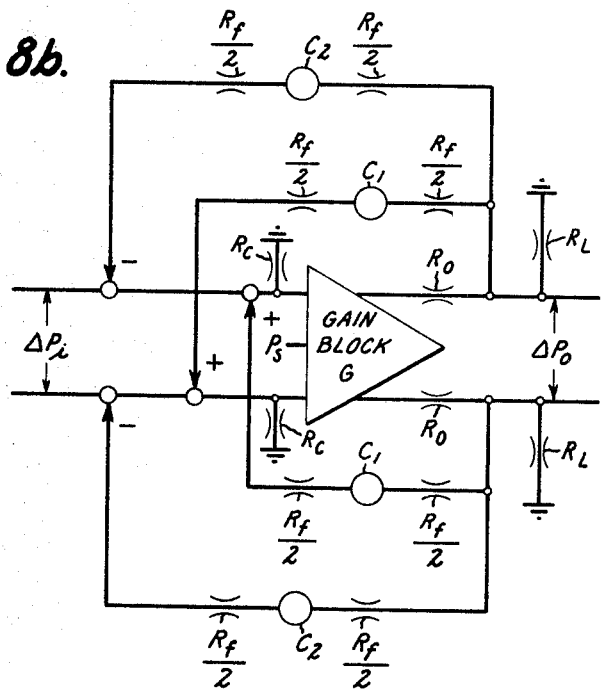

A comparison of the schematic circuit for the notch in FIG. 8b and the schematic circuits for the integrator in FIG. 6c and the lead-lag in FIG. 7c indicates the similarity among the various circuits and thereby indicates the manner in which the various laminae are arranged to form my fluidic notch component. Thus, a polarity reverser component, positive feedback ($+R_f$) lamina UHA-1, resistor separating laminae SS-17, and separator laminae SS-14 are superposed in the order named, and volumes $C_1$ are connected to the bottom face of the base plate as in the case of the integrator. Separator laminae SS-12, negative feedback ($-R_f$) lamina UHA-1, and resistor separating laminae SS-42 are interposed, in the order named, preferably between the gain block output and the polarity reverser component, and volumes $C_2$ are connected to the bottom face of the base plate as in the case of the lead-lag component. Finally, input resistor ($R_i$) lamina UHA-4 and separator lamina SS-11 are interposed, in the order named, between separator laminae SS-14 and the base plate. First common input-output paths leading from the midpoints of the positive feedback resistors to capacitors $C_1$ are provided through apertures 69 and the common input-output paths from the midpoints of the negative feedback resistors to capacitors $C_2$ are provided through apertures 75.

In view of the foregoing description, it is believed that the objects of my invention have been clearly attained. In particular, I have provided an improved analog-type fluid amplifier having a higher signal-to-noise ratio than conventional fluid amplifiers and an improved digital-type fluid amplifier having a more precise switching point by providing a relative roughness to at least one of the surfaces of the various fluid flow passages of the amplifier which obtains a substantial reduction in the noise level. The analog fluid amplifier is further improved by the addition of small vent holes at each upstream side of the side vent passages immediately adjacent the power nozzle. Although the deliberate roughening of some of the surfaces of the fluid amplifier reduces the noise level therein, a greater reduction in noise level and much higher signal-to-noise ratio is obtained in the preferred embodiment of my invention comprising a laminated structure of a plurality of parallel interconnected miniature analog fluid amplifiers. The parallel interconnected miniature fluid amplifiers are conveniently staged to form a fluidic gain block component having a high forward gain and very low noise level. Fluid flow resistors having precise and predetermined resistance values are also formed in thin laminae and are combined in negative feedback and input circuits of the fluidic gain block component to form a fluidic operational amplifier component. The operational amplifier may then be provided with various fluidic impedances, capacitors, and resistors, in the input and feedback circuits to form fluidic circuit components having desired frequency responses. The gain block component, operational amplifier and various frequency-responsive components herein described all have operating characteristics which are found to be far superior to any other existing fluidic components, primarily due to the much lower noise level obtained with the parallel interconnected miniature amplifier elements. All of my fluidic components herein described have no moving mechanical parts and are featured by a compactness which permits very short internal fluid flow passages thereby minimizing undesirable time delays and obtaining improved frequency response.

Having described several embodiments of my invention, it is believed obvious that changes may be made therein which fall within the scope of my invention as defined by the following claims.

I claim:

1. In a fluid amplifier device having an improved signal-to-noise ratio, at least two input fluid flow passages, one of said input passages comprising a power fluid inlet terminating in a nozzle to form a power jet of fluid, two output fluid flow passages, said input and output passages both defined by upper, lower, and side walls formed from a solid material impervious to the particular fluid employed, the improvement comprising means for providing a relative roughness of predetermined degree to the entire surface of at least one of said upper, lower, and side walls defining both said input and output passages for reducing the inherent noise characteristics of the fluid amplifier and thereby substantially improving the signal-to-noise ratio.

2. In the fluid amplifier device set forth in claim 1 wherein the fluid amplifier is of the analog type.

3. In the fluid amplifier device set forth in claim 1 wherein the fluid amplifier is of the digital type.

4. In the fluid amplifier device set forth in claim 1, the improvement further comprising a pair of small vent holes disposed at the upstream side of vent passages located intermediate said output passages and said input passages, and immediately adjacent the power nozzle for eliminating instability caused by natural flow entrainment of the portion of the power jet vented through said vent passages.

5. In a fluid amplifier device set forth in claim 1 wherein said wall roughness means comprises particles of predetermined size in adherence with said wall.

6. In the fluid amplifier device set forth in claim 5 wherein said particles comprise a powdery material chemically non-reactive with the fluid employed and having a ratio of particle diameter to power nozzle width of less than 1/10.

7. In the fluid amplifier device set forth in claim 1 wherein said wall roughness means comprises a construction of the fluid amplifier comprising a plurality of superposed laminae including an upper and lower cover plate and a plurality of at least two different intermediate laminae wherein a plurality of a first of the different laminae has formed therethrough a major part of the fluid flow passages and a plurality of a second of the different laminae has formed therethrough at least a part of some of said passages, said second laminae functioning as spacer members to form in combination with said first laminae and cover plates a plurality of parallel connected, separated, fluid amplifiers.

8. In the fluid amplifier device set forth in claim 7 wherein said superposed laminae each being of relatively small dimension whereby each of the parallel fluid amplifiers has a power nozzle width of approximately 0.010 inch or smaller.

9. In an improved analog-type fluid amplifier comprising a power fluid passage comprising a power fluid inlet terminating in a nozzle to form a power jet of fluid, two spaced output fluid passages for receiving the power jet, two control fluid passages each comprising a control fluid inlet terminating in a nozzle to form control jets of fluid, said control nozzles positioned on opposite sides of the power jet for controllably deflecting the power jet in proportion to the net sideways momentum of the control jets, two side vent passages each positioned intermediate a control nozzle and adjacent output fluid passage, the improvement comprising two small vent holes disposed at the upstream side of said side vent passages and immediately adjacent the power nozzle for eliminating instability caused by natural flow entrainment of the portion of the power jet vented through said side vent passages.

10. In the fluid amplifier set forth in claim 9 wherein the diameter size of said vent holes is in the range of one to two times the power nozzle width.

11. A fluid amplifier component comprising:
a first cover plate;
a second cover plate;
a plurality of at least two different laminae superposed between said cover plates;
a plurality of a first of the different laminae each having formed therethrough a major part of the fluid flow passages defining an analog-type fluid amplifier, said passages including a power fluid inlet passage terminating in a power nozzle, a pair of fluid receivers downstream of said power nozzle, a pair of control fluid inlet passages terminating in opposed control nozzles disposed intermediate said power nozzle and receivers, a pair of side vent passages disposed intermediate said control nozzles and receivers, and a center vent passage disposed intermediate said receivers;
a plurality of a second of the different laminae each having formed therethrough at least the remainder of said passages in overlapping relationship with respect to the corresponding passages in said first laminae, said second laminae functioning as spacer members between said first laminae to form parallel interconnected, separated fluid amplifiers; and
said cover plates and laminae assembled in fluid-tight relationship to form a laminated fluid amplifier component comprising a plurality of parallel interconnected, separated fluid amplifiers.

12. The fluid amplifier component set forth in claim 11 wherein one of said second laminae is superposed between adjacent layers of said first laminae, each of said layers of first laminae comprising the same number of first laminae, the number of first laminae per layer determined by the desired aspect ratio of the power nozzle.

13. The fluid amplifier component set forth in claim 12 wherein said first laminae each include fluid flow passages of a single fluid amplifier whereby the laminated assembly forms a low noise single-stage fluid amplifier component.

14. The fluid amplifier component set forth in claim 12 wherein said first laminae each include fluid flow passages of a plurality of serially connected fluid amplifiers whereby the laminated assembly forms a high gain, high signal-to-noise ratio, multistage fluid amplifier component.

15. The multistage fluid amplifier component set forth in claim 14 and further comprising a plurality of pairs of small vent holes disposed in each said second laminae at regions corresponding to the upstream sides of the side vent passages formed in said first laminae, a pair of said small vent holes disposed immediately adjacent each power nozzle and on opposite sides thereof.

16. The multistage fluid amplifier component set forth in claim 15 wherein said plurality of at least two different laminae are each of relatively small dimension whereby each amplifier has a power nozzle width of approximately 0.010 inch or smaller and an aspect ratio less than 1.0 to thereby obtain a multistage fluid amplifier component having a signal-to-noise ratio significantly higher than conventional staged larger size fluid amplifiers having power nozzle widths of approximately 0.020 inch or larger.

17. The multistage fluid amplifier component set forth in claim 16 and further comprising laminated internal supply pressure manifold means for supplying power fluid at selected different pressures to the staged fluid amplifiers to thereby form a fluidic gain block component having a high forward gain G.

18. The fluidic gain block component set forth in claim 17 wherein:
said second laminae each provided with a pair of first apertures therethrough aligned with the output of the fluid receivers of the last stage fluid amplifier, a pair of second apertures aligned with the input to the control fluid inlet passages of the first stage fluid amplifier, and a plurality of third apertures equal in number to the number of staged amplifiers and aligned with the inputs to the respective power fluid inlet passages;
said first and second laminae superposed between a first of said cover plates and a third different lamina, said third lamina provided with said pair of first apertures, said pair of second apertures, and said plurality of third apertures respectively aligned with the corresponding apertures in said second laminae;
said laminated internal supply pressure manifold means comprising a plurality of alternately superposed fourth and fifth different laminae, superposed between a second of said cover plates and said third lamina;
said fourth and fifth laminae each provided with said pair of second apertures aligned with the corresponding apertures in said third lamina, said fourth and fifth laminae each also provided with a first pair of aligned wide channels having first ends thereof aligned with said pair of first apertures in said third lamina, said fourth laminae each also provided with said plurality of third apertures aligned with the corresponding apertures in said third lamina;
said fifth laminae each also provided with a third channel having a length and width sufficient to substantially overlap said plurality of third apertures in said fourth laminae, the effective height dimension of the channel formed by the plurality of superposed fourth and fifth laminae determining a fluid flow resistance for effecting selected pressure drops of the power fluid flowing therein and passing from the last stage amplifier to the first stage amplifier; and
said first cover plate provided with ports aligned with said center vent passages and further provided with ports aligned with said small vent holes in the side vent passages.

19. The fluidic gain block component set forth in claim 18 wherein said second cover plate provided with:
a port aligned with the particular aperture of said plurality of third apertures in said fourth laminae associated with the last stage amplifier for supplying power fluid from an external source thereto;
a first pair of ports aligned with said first ends of said first pair of wide channels in said fourth laminae for supplying the fluidic gain block component output externally thereof;
a second pair of ports aligned with said pairs of second apertures for supplying a control fluid signal to the input of the fluidic gain block component.

20. The fluidic gain block component set forth in claim 18 and further comprising laminated input and feedback fluid flow resistor means for forming fluidic input circuits and negative feedback circuits in the gain block component to thereby form a fluidic operational amplifier component.

21. The fluidic operational amplifier component set forth in claim 20 wherein
said second cover plate provided with:
a first aperture interconnected with an input port; said first aperture aligned with the particular aperture of said plurality of third apertures in said fourth laminae associated with the last stage amplifier for supplying power fluid from an external source thereto;
a pair of apertures interconnected with a pair of output ports, the latter pair of apertures aligned with second ends of said first pair of wide channels in said fourth laminae for supplying the operational amplifier component output $\Delta P_o$ externally thereof;
another pair of apertures interconnected with a pair of input ports, the latter pair of apertures aligned with first ends of said first pair of wide channels in said fourth laminae for supplying a control input signal $\Delta P_i$ to the input of the operational amplifier component;
said laminated input and feedback resistor means comprises a plurality of additional laminae superposed between said second cover plate and the particular of said fourth laminae furthest spaced from said third lamina;
said additional laminae having formed therein fluid flow passages for interconnecting said control fluid signal input ports in said second cover plate with said pair of second apertures in said furthest spaced fourth lamina to thereby form said fluidic input circuits;
said additional laminae also having formed therein passages for interconnecting the output of the operational amplifier with said pair of second apertures in said furthest spaced fourth lamina to thereby form said fluidic negative feedback circuits;
at least two of said additional laminae having formed therethrough narrow channels for providing passive linear resistances to fluid flow therethrough;
at least one of said passive resistance laminae comprising a portion of said fluidic input circuits and forming fluidic input resistors $R_i$; and
at least another of said passive resistance laminae comprising a portion of said fluidic negative feedback circuits and forming fluidic negative feedback resistors $R_f$, the magnitude of the closed loop gain being a fixed gain $\frac{\Delta P_o}{\Delta P_i} = \frac{R_f}{R_i}$
determined solely by the passive resistors for the high values of forward gain G of the gain block to thereby provide a fixed linear gain for the operational amplifier substantially independent of variations in operational amplifier load or in the power fluid supply pressure.

22. The fluidic operational amplifier component set forth in claim 21 wherein:
said additional laminae comprise the following laminae superposed in the order recited from said second cover plate to said fourth lamina furthest spaced from said third lamina;
a sixth different lamina;
at least one of said passive resistance laminae provided with at least one pair of equally dimensioned channels forming input resistors $R_{iA}$, said sixth lamina functioning as an isolator between said second cover plate and the input resistors lamina;
at least one seventh different lamina;
at least one of said passive resistance laminae provided with at least one pair of equally dimensioned channels forming negative feedback resistors $R_f$, said seventh lamina functioning as an isolator between said input and negative feedback resistors laminae; and at least one eighth different lamina functioning as an isolator between said negative feedback resistors lamina and said fourth lamina furthest spaced from said third lamina;

said sixth, seventh, eighth and input and feedback resistors laminae each provided with the particular aperture of said plurality of third apertures associated with the last stage amplifier and aligned therewith and further provided with aligned pairs of third and fourth apertures, said pairs of third apertures aligned with said second ends of said first pairs of wide channels in said fourth laminae to thereby provide passages for the output $\Delta P_o$ to said output ports in said second cover plate;

said fourth and fifth laminae each also provided with a second pair of aligned wide channels having second ends thereof aligned with said pairs of fourth apertures;

said seventh and eighth laminae each provided with a pair of wide apertures aligned with said pairs of second apertures, second ends of the input and feedback resistor channels aligned with said pairs of second apertures to thereby provide passages for a control input signal $\Delta P_{iA}$ from the output of the input resistors and for the negative feedback signal to the input of the first amplifier;

said sixth lamina provided with said pair of first apertures aligned with first ends of the input resistor channels and with said first ends of said first pair of wide channels to thereby provide passages for the control input signal from said input ports in said second cover plate to the input of the input resistors; and said eighth lamina provided with a pair of fifth apertures aligned with first ends of said second pair of wide channels and with first ends of the feedback resistor channels to thereby provide passages from the output of the operational amplifier to the input of the negative feedback resistors.

23. The fluidic operational amplifier set forth in claim 22 and further comprising a pair of fixed volumes for providing passive capacitances to fluid flow therethrough, said volumes in communication with the apertures in said second cover plate which are interconnected with said output ports and also in communication with a pair of passages in said second cover plate aligned with said pairs of fourth apertures, said volumes preventing instability in the closed loop operation of the operational amplifier.

24. The fluidic operational amplifier component set forth in claim 23 and further comprising:

said input resistors lamina provided with a second pair of equally dimensioned channels forming input resistors $R_{iB}$;

said sixth lamina provided with a pair of apertures aligned with first ends of the input resistor channel $R_{iB}$ and with a further pair of apertures in said second cover plate interconnected with a second pair of input ports to thereby provide passages for a second control input signal $\Delta P_{iB}$ from the second pair of input ports to the input of input resistors $R_{iB}$, the second ends of the input resistor channels $R_{iB}$ aligned with said pair of wide apertures in said seventh lamina to thereby provide for the summation of the control input signals $\Delta P_{iA}$ and $\Delta P_{iB}$ at the output of the input resistors and for passage thereof to the input of the first amplifier whereby a two-input summing operational amplifier output $\Delta P_o = \frac{R_f}{R_{iA}} \Delta P_{iA} \frac{R_f}{R_{iB}} \Delta P_{iB}$ is obtained.

25. The fluidic operational amplifier set forth in claim 22 and further comprising selected laminae means superposed between said seventh lamina and said fourth lamina furthest spaced from said third lamina, and fixed volumes, for converting the operational amplifier to a particular fluidic frequency-responsive component.

26. The fluidic frequency-responsive component set forth in claim 25 wherein said selected laminae means comprise:

said negative feedback resistors lamina;

lamina means for separating each resistance in said negative feedback resistors lamina into two parts;

laminae means for reversing the polarity of the feedback signal to thereby also obtain a positive feedback signal;

passive resistance laminae means for forming a portion of a positive feedback circuit including positive feedback resistors;

lamina means for separating each resistance in said positive feedback resistors laminae means into two parts;

and further comprising:

a first pair of fixed volumes for providing passive capacitance to fluid flow therethrough, said volumes in communication with said negative feedback resistors lamina for forming a portion of the negative feedback circuit wherein the combination of said negative feedback resistors lamina and said first pair of fixed volumes form series circuit impedances each comprising feedback resistors $\frac{R_f}{2}$ and a capacitor $C_2$ wherein the natural time constant $\tau_2 = \frac{R_f C_2}{4}$ of the negative feedback circuit determines the second frequency response lead break of a fluidic notch component characterized by a first lag break, first and second lead breaks, and a second lag break; and a second pair of fixed volumes connected to said second cover plate and in communication with said positive feedback resistors laminae means for forming a portion of the positive feedback circuit wherein the combination of said positive feedback resistors laminae means and said second pair of fixed volumes form series circuit impedances each comprising feedback resistors $\frac{R_f}{2}$ and a capacitor $C_1$ wherein the natural time constant $\tau_1 = \frac{R_f C_1}{4}$ of the positive feedback circuit determines the first frequency response lead break of the fluidic notch component.

27. The fluidic frequency-responsive component set forth in claim 25 wherein said selected laminae means comprise:

said negative feedback resistors lamina;

laminae means for reversing the polarity of the feedback signal to thereby obtain a positive feedback signal;

passive resistance laminae means for forming a portion of a positive feedback circuit;

and further comprising:

a first pair of fixed volumes for providing passive capacitances to fluid flow therethrough, said volumes in communication with the apertures in said second cover plate which are interconnected with said output ports and also in communication with a pair of passages in said second cover plate aligned with said pairs of fourth apertures, said volumes preventing instability in the closed loop operation of the fluidic frequency-responsive component; and a second pair of fixed volumes connected to said second cover plate and in communication with said positive feedback resistance laminae means for forming a portion of the positive feedback circuit wherein the combination of said positive feedback resistance laminae means and said second pair of fixed volumes form series circuit impedances each comprising feedback resistors and an integrating capacitor to thereby form a fluidic integrator component providing the mathematical computation of integration over a relatively wide frequency range of control input signals determined by the frequency response lag and lead breaks associated therewith.

28. The fluidic integrator component set forth in claim 27 wherein:

said selected laminae means comprise the following laminae superposed in the order recited from said furthest spaced fourth lamina to said seventh lamina;

said at least one eighth different lamina;

said negative feedback resistors lamina;

said polarity reversing laminae means comprising the following laminae superposed in the order recited from said negative feedback resistors lamina toward said second cover plate;

a second said seventh lamina;

at least one ninth different lamina for reversing one side of the differentially pressurized integrator output signal $\Delta P_o$, said second seventh lamina functioning as an isolator between said negative feedback resistors lamina and said ninth lamina;

a second said eighth lamina;

at least one said ninth lamina in reversed orientation for reversing the second side of the output signal $\Delta P_o$, the second said eighth lamina functioning as an isolator between said ninth and reversed ninth laminae;

a third said eighth lamina;

said positive feedback resistance laminae means comprising the following laminae superposed in the order recited from the third said eighth lamina toward said second cover plate;

at least one passive resistance lamina forming positive feedback resistors $R_f$; and at least one tenth different lamina, said tenth lamina functioning to separate each resistance in said positive feedback resistors lamina into two parts, the third said eighth lamina functioning as an isolator between said reversed ninth lamina and said positive feedback resistors lamina, each said series circuit impedance comprising the two parts of a positive feedback resistor and the integrating capacitor interposed therebetween.

29. The fluidic integrator component set forth in claim 28 wherein:

said ninth, tenth and positive feedback resistors laminae each provided with the particular aperture of said plurality of third apertures associated with the last stage amplifier and aligned therewith and further provided with said pair of third apertures and said pair of wide apertures respectively aligned with the corresponding wide apertures in said seventh lamina, said tenth laminae each provided with said pair of fourth apertures aligned with the corresponding apertures in said seventh lamina;

said ninth laminae each provided with one aperture of said pair of fourth apertures and aligned therewith wherein said one aperture is associated with a first side of the differentially pressurized output signal $\Delta P_o$, said ninth laminae each also provided with one aperture of said pair of fifth apertures and aligned therewith wherein the latter one aperture is associated with the second side of the differentially pressurized output signal, the region normally corresponding to the second of said pair of fourth and fifth apertures comprising first and second ends of a wide channel respectively aligned therewith, the latter wide channel thereby reversing the polarity of one side of the output signal $\Delta P_o$, said latter wide channel causing a portion of the fluid flow from the output of the stabilizing capacitors to be directed through said latter channel and toward the input of said positive feedback resistors whereas the remainder of the stabilizing capacitor output fluid flow is directed toward the input of said negative feedback resistors;

said sixth, seventh and passive resistance laminae each also provided with a pair of sixth apertures aligned with passages in said second cover plate which are in communication with said pair of integrating capacitors, said tenth laminae each provided with a pair of wide apertures aligned with said sixth apertures and of width sufficient to substantially overlap the midpoints of the positive feedback resistors and the sixth apertures to thereby provide passages through said sixth apertures from the midpoint of said positive feedback resistors to said integrating capacitors.

30. The fluidic frequency-responsive component set forth in claim 25 wherein said selected laminae means comprise:

said negative feedback resistors lamina;

laminae means for separating each resistance in said negative feedback resistors lamina into two parts; and a pair of fixed volumes connected to said second cover plate and in communication with said negative feedback resistors lamina for forming a portion of the negative feedback circuit wherein the combination of said negative feedback resistors lamina and said fixed volumes form series circuit impedances each comprising feedback resistors and a capacitor to thereby form a lead-lag type fluidic differentiator component providing the mathematical computation of differentiation over a frequency range of control input signals determined by the frequency response lead and lag breaks associated therewith.

31. The fluidic lead-lag circuit component set forth in claim 30 wherein:

said selected laminae means comprise the following laminae superposed in the order recited from said furthest spaced fourth lamina to said seventh lamina;

at least one eleventh different lamina functioning as an isolator between said furthest spaced fourth lamina and said negative feedback resistors lamina;

said negative feedback resistors lamina;

said resistance separating laminae means comprising at least one twelfth different laminae, said twelfth lamina functioning to separate each resistance in said negative feedback resistors lamina into two parts.

32. The fluidic lead-lag circuit component set forth in claim 31 wherein:

said eleventh and twelfth laminae each provided with the particular aperture of said plurality of said third apertures associated with the last stage amplifier and aligned therewith and further provided with said pairs of first and third apertures respectively aligned with the corresponding apertures in said sixth lamina;

said eleventh lamina further provided with a pair of wide apertures aligned with the wide apertures in said seventh lamina, said twelfth lamina further provided with a pair of apertures aligned with the wide apertures in said eleventh lamina; and said twelfth lamina provided with a pair of wide apertures aligned with said pair of fourth apertures and of width sufficient to substantially overlap the midpoint of the negative feedback resistors and the fourth apertures in said seventh lamina to thereby provide passages through said fourth apertures from the midpoint of said negative feedback resistors to said capacitors.

33. The multistage fluid amplifier component set forth in claim 14 wherein said plurality of at least two different laminae are each of relatively small dimension whereby each amplifier has a power nozzle width of approximately 0.010 inch or smaller and an aspect ratio less than 1.0 to thereby obtain a multistage fluid amplifier component having a signal-to-noise ratio significantly higher than conventional-staged larger size fluid amplifiers having power nozzle widths of approximately 0.020 inch or larger.

34. The multistage fluid amplifier component set forth in claim 33 wherein said plurality of at least two different laminae are each approximately 1½ inch long, two-third inch wide, and of thickness of a range of 0.001 to 0.010 inch for a five-stage fluid amplifier component.

35. The multistage fluid amplifier component set forth in claim 33 and further comprising laminated internal supply pressure manifold means for supplying power fluid at selected different pressures to the staged fluid amplifiers to thereby form a fluidic gain block component having a high forward gain G.

36. The fluidic gain block component set forth in claim 35 wherein:

said second laminae each provided with a pair of first apertures therethrough aligned with the output of the fluid receivers of the last stage fluid amplifier, a pair of second apertures aligned with the input to the control fluid inlet passages of the first stage fluid amplifier, and a plurality of third apertures equal in number to the number of staged amplifiers and aligned with the inputs to the respective power fluid inlet passages;

said first and second laminae superposed between a first of said cover plates and a third different lamina, said third lamina provided with said pair of first apertures, said pair of second apertures, and said plurality of third apertures respectively aligned with the corresponding apertures in said second laminae;

said laminated internal supply pressure manifold means comprising a plurality of alternately superposed fourth and fifth different laminae, superposed between a second of said cover plates and said third lamina;

said fourth and fifth laminae each provided with said pair of second apertures aligned with the corresponding apertures in said third lamina, said fourth and fifth laminae each also provided with a first pair of aligned wide channels having first ends thereof aligned with said pair of first apertures in said third lamina, said fourth laminae each also provided with said plurality of third apertures aligned with the corresponding apertures in said third lamina;

said fifth laminae each also provided with a third channel having a length and width sufficient to substantially overlap said plurality of third apertures in said fourth laminae, the effective height dimension of the channel formed by the plurality of superposed fourth and fifth laminae determining a fluid flow resistance for effecting selected pressure drops of the power fluid flowing therein and passing from the last stage amplifier to the first stage amplifier; and said first cover plate provided with ports aligned with said center vent passages.

37. The fluidic gain block component set forth in claim 36 wherein:

said second cover plate provided with;
 a port aligned with the particular aperture of said plurality of third apertures in said fourth laminae associated with the last stage amplifier for supplying power fluid from an external source thereto;
 a first pair of ports aligned with said first ends of said first pair of wide channels in said fourth laminae for supplying the fluidic gain block component output externally thereof; and
 a second pair of ports aligned with said pairs of second apertures for supplying a control fluid signal to the input of the fluidic gain block component.

38. The fluidic gain block component set forth in claim 36 and further comprising laminated input and feedback fluid flow resistor means for forming fluidic input circuits and negative feedback circuits in the gain block component to thereby form a fluidic operational amplifier component.

39. The fluidic operational amplifier component set forth in claim 38 wherein:

said second cover plate provided with;
 a first aperture interconnected with an input port, said first aperture aligned with the particular aperture of said plurality of third apertures in said fourth laminae associated with the last stage amplifier for supplying power fluid from an external source thereto;
 a pair of apertures interconnected with a pair of output ports, the latter pair of apertures aligned with second ends of said first pair of wide channels in said fourth laminae for supplying the operational amplifier component output $\Delta P_o$ externally thereof; and
 another pair of apertures interconnected with a pair of input ports, the latter pair of apertures aligned with first ends of said first pair of wide channels in said fourth laminae for supplying a control fluid input signal $\Delta P_i$ to the input of the operational amplifier component;

said laminated input and feedback resistor means comprise a plurality of additional laminae superposed between said second cover plate and the particular of said fourth laminae furthest spaced from said third lamina;

said additional laminae having formed therein fluid flow passages for interconnecting said control fluid signal input ports in said second cover plate with said pair of second apertures in said furthest spaced fourth lamina to thereby form said fluidic input circuits;

said additional laminae also having formed therein passages for interconnecting the output of the operational amplifier with said pair of second apertures in said furthest spaced fourth lamina to thereby form said fluidic negative feedback circuits;

at least two of said additional laminae having formed therethrough narrow channels for providing passive linear resistances to fluid flow therethrough;

at least one of said passive resistance laminae comprising a portion of said fluidic input circuits and forming fluidic input resistors $R_i$;

at least another of said passive resistance laminae comprising a portion of said fluidic negative feedback circuits and forming fluidic negative feedback resistors $R_f$, the magnitude of the closed loop gain being a fixed gain $$\frac{\Delta P_o}{\Delta P_i} = \frac{R_f}{R_i}$$ determined solely by the passive resistors for the high values of forward gain G of the gain block to thereby provide a fixed linear gain for the operational amplifier substantially independent of variations in operational amplifier load or in the power fluid supply pressure.

40. The fluidic operational amplifier component set forth in claim 39 wherein:

said additional laminae comprise the following laminae superposed in the order recited from said second cover plate to said fourth lamina furthest spaced from said third lamina;

a sixth different lamina;

at least one of said passive resistance laminae provided with at least one pair of equally dimensioned channels forming input resistors $R_{i,4}$, said sixth lamina functioning as an isolator between said second cover plate and the input resistors lamina;

at least one seventh different lamina;

at least one of said passive resistance laminae provided with at least one pair of equally dimensioned channels forming negative feedback resistors $R_f$, said seventh lamina functioning as an isolator between said input and negative feedback resistors laminae; and at least one eighth different lamina functioning as an isolator between said negative feedback resistors lamina and said fourth lamina furthest spaced from said third lamina;

said sixth, seventh, eighth and input and feedback resistors laminae each provided with the particular aperture of said plurality of third apertures associated with the last stage amplifier and aligned therewith and further provided with aligned pairs of third and fourth apertures, said pairs of third apertures aligned with said second ends of said first pairs of wide channels in said fourth laminae to thereby provide passages for the output $\Delta P_o$ to said output ports in said second cover plate;

said fourth and fifth laminae each also provided with a second pair of aligned wide channels having second ends thereof aligned with said pairs of fourth apertures;

said seventh and eighth laminae each provided with a pair of wide apertures aligned with said pairs of second apertures, second ends of the input and feedback resistor channels aligned with said pairs of second apertures to thereby provide passages for a control input signal $\Delta P_{i,4}$ from the output of the input resistors and for the negative feedback signal to the input of the first amplifier;

said sixth lamina provided with said pair of first apertures aligned with first ends of the input resistor channels and with said first ends of said first pair of wide channels to thereby provide passages for the control input signal from said input ports in said second cover plate to the input of the input resistor;

said eighth lamina provided with a pair of fifth apertures aligned with first ends of said second pair of wide channels and with first ends of the feedback resistor channels to thereby provide passages from the output of the operational amplifier to the input of the negative feedback resistors.

41. The fluidic operational amplifier set forth in claim 40 and further comprising a pair of fixed volumes for providing passive capacitances to fluid flow therethrough, said volumes in communication with the apertures in said second cover plate which are interconnected with said output ports and also in communication with a pair of passages in said second cover plate aligned with said pairs of fourth apertures, said volumes preventing instability in the closed loop operation of the operational amplifier.

42. The fluidic operational amplifier component set forth in claim 41 and further comprising:
said input resistors lamina provided with a second pair of equally dimensioned channels forming input resistors $R_{iB}$;
said sixth lamina provided with a pair of apertures aligned with first ends of the input resistor channels $R_{iB}$ and with a further pair of apertures in said second cover plate interconnected with a second pair of input ports to thereby provide passages for a second control input signal $\Delta P_{iB}$ from the second pair of input ports to the input of input resistors $R_{iB}$, the second ends of the input resistor channels $R_{iB}$ aligned with said pair of wide apertures in said seventh lamina to thereby provide for the summation of the control input signals $\Delta P_{iA}$ and $\Delta P_{iB}$ at the output of the input resistors and for passage thereof to the input of the first amplifier whereby a two-input summing operational amplifier output $\Delta P_o = \frac{R_f}{R_{iA}} \Delta P_{iA} + \frac{R_f}{R_{iB}} \Delta P_{iB}$ is obtained.

43. The fluidic operational amplifier set forth in claim 40 and further comprising selected laminae means superposed between said seventh lamina and said fourth lamina furthest spaced from said third lamina, and fixed volumes, for converting the operational amplifier to a particular fluidic frequency-responsive component.

44. The fluidic frequency-responsive component set forth in claim 43 wherein said selected laminae means comprise:
said negative feedback resistors lamina;
laminae means for reversing the polarity of the feedback signal to thereby also obtain a positive feedback signal;
passive resistance laminae means for forming a portion of a positive feedback circuit;
and further comprising:
a first pair of fixed volumes for providing passive capacitances to fluid flow therethrough, said volumes in communication with the apertures in said second cover plate which are interconnected with said output ports and also in communication with a pair of passages in said second cover plate aligned with said pairs of fourth apertures, said volumes preventing instability in the closed loop operation of the fluidic frequency-responsive component; and
a second pair of fixed volumes connected to said second cover plate and in communication with said positive feedback resistance laminae means for forming a portion of the positive feedback circuit wherein the combination of said positive feedback resistance laminae means and said second pair of fixed volumes form series circuit impedances each comprising feedback resistors and an integrating capacitor to thereby form a fluidic integrator component providing the mathematical computation of integration over a relatively wide frequency range of control input signals determined by the frequency response lag and lead breaks associated therewith.

45. The fluidic integrator component set forth in claim 44 wherein:
said selected laminae means comprise the following laminae superposed in the order recited from said furthest spaced fourth lamina to said seventh lamina;
said at least one eighth different lamina;
said negative feedback resistors lamina;
said polarity reversing laminae means comprising the following laminae superposed in the order recited from said negative feedback resistors lamina toward said second cover plate;

a second said seventh lamina;
at least one ninth different lamina for reversing one side of the differentially pressurized integrator output signal $\Delta P_o$, said second seventh lamina functioning as an isolator between said negative feedback resistors lamina and said ninth lamina;
a second said eighth lamina,
at least one said ninth lamina in reversed orientation for reversing the second side of the output signal $\Delta P_o$, the second said eighth lamina functioning as an isolator between said ninth and reversed ninth laminae;
a third said eighth lamina;
said positive feedback resistance laminae means comprising the following laminae superposed in the order recited from the third said eighth lamina toward said second cover plate;
at least one passive resistance lamina forming positive feedback resistors $R_f$; and
at least one tenth different lamina, said tenth lamina functioning to separate each resistance in said positive feedback resistors lamina into two parts, the third said eighth lamina functioning as an isolator between said reversed ninth lamina and said positive feedback resistors lamina, each said series circuit impedance comprising the two parts of a positive feedback resistor and the integrating capacitor interposed therebetween.

46. The fluidic integrator component set forth in claim 45 wherein:
said ninth, tenth and positive feedback resistors laminae each provided with the particular aperture of said plurality of third apertures associated with the last stage amplifier and aligned therewith and further provided with said pair of third apertures and said pair of wide apertures respectively aligned with the corresponding wide apertures in said seventh laminae, said tenth laminae each provided with said pair of fourth apertures aligned with the corresponding apertures in said seventh lamina;
said ninth laminae each provided with one aperture of said pair of fourth apertures and aligned therewith wherein said one aperture is associated with a first side of the differentially pressurized output signal $\Delta P_o$, said ninth laminae each also provided with one aperture of said pair of fifth apertures and aligned therewith wherein the latter one aperture is associated with the second side of the differentially pressurized output signal, the region normally corresponding to the second of said pair of fourth and fifth apertures comprising first and second ends of a wide channel respectively aligned therewith, the latter wide channel thereby reversing the polarity of one side of the output signal $\Delta P_o$, said latter wide channel causing a portion of the fluid flow from the output of the stabilizing capacitors to be directed through said latter channel and toward the input of said positive feedback resistors whereas the remainder of the stabilizing capacitor output fluid flow is directed toward the input of said negative feedback resistors;
said sixth, seventh and passive resistance laminae each also provided with a pair of sixth apertures aligned with passages in said second cover plate which are in communication with said pair of integrating capacitors, said tenth laminae each provided with a pair of wide apertures aligned with said sixth apertures and of width sufficient to substantially overlap the midpoints of the positive feedback resistors and the sixth apertures to thereby provide passages through said sixth apertures from the midpoint of said positive feedback resistors to said integrating capacitors.

47. The fluidic frequency-responsive component set forth in claim 43 wherein said selected laminae means comprise:
said negative feedback resistors lamina;
laminae means for separating each resistance in said negative feedback resistors lamina into two part; and
a pair of fixed volumes connected to said second cover plate and in communication with said negative feedback resistors lamina for forming a portion of the negative feedback circuit wherein the combination of said negative feedback resistors lamina and said fixed volumes form series circuit impedances each comprising feedback resistors and a capacitor to thereby form a lead-lag type fluidic differentiator component providing the mathematical computation of differentiation over a frequency range of control input signals determined by the frequency response lead and lag breaks associated therewith.

48. The fluidic lead-lag circuit component set forth in claim 47 wherein:
said selected laminae means comprise the following laminae superposed in the order recited from said furthest spaced fourth lamina to said seventh lamina;
at least one eleventh different lamina functioning as an isolator between said furthest spaced fourth lamina and said negative feedback resistors lamina;
said negative feedback resistors lamina;
said resistance separating laminae means comprising at least one twelfth different lamina, said twelfth lamina functioning to separate each resistance in said negative feedback resistors lamina into two parts.

49. The fluidic lead-lag circuit component set forth in claim 48 wherein:
said eleventh and twelfth laminae each provided with the particular aperture of said plurality of said third apertures associated with the last stage amplifier and aligned therewith and further provided with said pairs of first and third apertures respectively aligned with the corresponding apertures in said sixth lamina;
said eleventh lamina further provided with a pair of wide apertures aligned with the wide apertures in said seventh lamina, said twelfth lamina further provided with a pair of apertures aligned with the wide apertures in said eleventh lamina; and
said twelfth lamina provided with a pair of wide apertures aligned with said pair of fourth apertures and of width sufficient to substantially overlap the midpoint of the negative feedback resistors and the fourth apertures in said seventh lamina to thereby provide passages through said fourth apertures from the midpoint of said negative feedback resistors to said capacitors.

50. The fluidic frequency-responsive component set forth in claim 43 wherein said selected laminae means comprise:
said negative feedback resistors lamina;
lamina means for separating each resistance in said negative feedback resistors lamina into two parts;
laminae means for reversing the polarity of the feedback signal to thereby also obtain a positive feedback signal;
passive resistance laminae means for forming a portion of a positive feedback circuit including positive feedback resistors;
lamina means for separating each resistance in said positive feedback resistors laminae means into two parts;
and further comprising:
a first pair of fixed volumes for providing passive capacitances to fluid flow therethrough, said volumes in communication with said negative feedback resistors lamina for forming a portion of the negative feedback circuit wherein the combination of said negative feedback resistors lamina and said first pair of fixed volumes form series circuit impedances each comprising feedback resistors $\frac{R_f}{2}$ and a capacitor $C_2$ wherein the natural time constant $\tau_2 = \frac{R_f C_2}{4}$ of the negative feedback circuit determines the second frequency response lead break of a fluidic notch component characterized by a first lag break, first and second lead breaks, and a second lag break; and
a second pair of fixed volumes connected to said second cover plate and in communication with said positive feedback resistors laminae means for forming a portion of the positive feedback circuit wherein the combination of said positive feedback resistors laminae means and said second pair of fixed volumes form series circuit impedances each comprising feedback resistors $\frac{R_f}{2}$ and a capacitor $C_1$ wherein the natural time constant $\tau_1 = \frac{R_f C_1}{4}$ of the positive feedback circuit determines the first frequency response lead break of the fluidic notch component.

51. A laminated fluidic component having no moving mechanical parts and characterized by compactness, low noise level, high signal-to-noise ratio and excellent frequency response and comprising:
a cover plate;
a base plate; and
a first plurality of laminae superposed between said cover and base plates, the combination of said plates and laminae retained in fluid-tight relationship, said first plurality of laminae comprising a staged amplifier section and a supply pressure manifold section forming a fluidic gain block component;
said staged amplifier section comprising:
a plurality of first different laminae each having formed therethrough a major part of the fluid flow passages defining a plurality of serially connected analog-type fluid amplifiers each including a power fluid nozzle, a pair of control fluid nozzles, a pair of fluid receivers and vent passages;
a plurality of second different laminae each having formed therethrough at least the remainder of said passages in overlapping relationship with respect to the corresponding passages in said first laminae, said second laminae functioning as spacer members between said first laminae to form parallel interconnected, separated, miniature size fluid amplifiers, said first and second laminae forming a high gain, high signal-to-noise ratio multistage fluid amplifier component; and
said first and second laminae superposed between said cover plate and a third different lamina functioning as an isolator between said staged amplifier section and said supply pressure manifold section;
said supply pressure manifold section comprising:
a plurality of alternately superposed fourth and fifth different laminae;
said fourth laminae each provided with a plurality of apertures equal in number to the number of staged amplifiers and aligned with the inputs to the power fluid nozzles thereof;
said fifth laminae each provided with a channel overlapping said plurality of apertures, the effective height dimension of said channel as determined by the number of superposed fourth and fifth laminae determining the fluid flow resistance to power fluid flowing therethrough and thereby determining a different particular pressure of the power fluid supplied to each stage fluid amplifier;
said cover plate provided with ports aligned with said vent passages in said fluid amplifiers;
said base plate provided with:
an input port in communication with the input to the power fluid nozzle of the last stage fluid amplifier for supplying power fluid from an external source thereto;
a pair of input ports in communication with the input to the control fluid nozzles of the first stage fluid amplifier for supplying a control fluid input signal $\Delta P_i$ thereto; and
a pair of output ports in communication with the output of the receivers of the last stage fluid amplifier for supplying the fluidic gain block component output $\Delta P_o$ externally thereof.

52. The laminated fluidic component set forth in claim 51 wherein:
said plurality of laminae are each of small dimension approximately 1½ inch long, two-third inch wide and of thickness in the range 0.001 to 0.010 inch for a five-stage amplifier fluidic gain block component;

the power nozzle width of each amplifier being approximately 0.010 inch or smaller, the smaller dimensions permitting very short internal fluid flow passages thereby minimizing undersirable time delays and obtaining improved frequency response compared to conventional larger size fluid amplifiers having power nozzle widths of approximately 0.020 inch or larger;

the parallel interconnected, separated, miniature fluid amplifier structure obtaining improved signal-to-noise ratio and reduced noise level compared to the conventional fluid amplifier; and the multistage amplifiers supplied with the different pressures obtaining a high forward gain G for the fluidic gain block component.

53. The laminated fluidic component set forth in claim 51 and further comprising:

a second plurality of laminae superposed between said base plate and said supply pressure manifold section and comprising;

laminae having formed therethrough at least one pair of equally dimensioned narrow channels of predetermined length and width for providing predetermined passive linear resistances to fluid flow therethrough, at least one of the linear resistances laminae forming fluidic input resistors $R_i$, and at least another of the linear resistances laminae forming fluidic negative feedback resistors $R_f$; and a plurality of laminae superposed between the negative feedback resistors lamina and said supply pressure manifold section for isolation thereof, and between the negative feedback resistors lamina and the input resistors lamina for isolation thereof, the latter plurality of laminae forming a part of input and negative feedback networks in communication with said gain block component, and providing for the summation of the control fluid input signal and negative feedback signal after respective passage through the input and feedback resistors to thereby form a fluidic operational amplifier component having a fixed gain $\frac{\Delta P_o}{\Delta P_i} = \frac{R_f}{R_i}$ determined solely by the passive resistors for the high values of forward gain G of the gain block to thereby provide a fixed linear gain substantially independent of variations in operational amplifier load or in the power fluid supply pressure.

54. The laminated fluidic operational amplifier component set forth in claim 53 and further comprising a pair of fixed volumes for providing passive capacitances to fluid flow therethrough, said volumes connected to said base plate and in communication with the output of the receivers of the last stage amplifier for preventing instability of the operational amplifier.

55. The laminated fluidic operational amplifier component set forth in claim 53 and further comprising additional laminae means superposed between said base plate and said supply pressure manifold section, and fixed volumes, for providing selected fluidic impedances in the feedback circuits of said operational amplifier to thereby convert the operational amplifier to a particular frequency-responsive fluidic component.

56. The laminated frequency-responsive fluidic component set forth in claim 55 wherein said additional laminae means comprise:

a third plurality of laminae superposed between said base plate and said supply pressure manifold section and comprising:

a plurality of laminae for reversing the polarity of the feedback signal to thereby also obtain a positive feedback signal;

at least one linear resistances lamina forming fluidic positive feedback resistors $R_f$;

at least one lamina for separating each resistance in said positive feedback resistors lamina into two parts;

a first pair of fixed volumes for providing passive capacitances to fluid flow therethrough, said volumes connected to said base plate and in communication with the output of the receivers of the last stage amplifier for preventing instability of the frequency-responsive fluidic component; and a second pair of fixed volumes connected to said base plate in communication with said positive feedback resistors lamina forming a pair of series circuit impedances each comprising the two parts of a positive feedback resistor and one of said second pair of volumes interposed therebetween to form a laminated fluidic integrator component providing the mathematical computation of integration over a relatively wide frequency range of control input signals.

57. The laminated frequency-responsive fluidic component set forth in claim 55 wherein said additional laminae means comprise:

at least one lamina for separating each resistance in said negative feedback resistors lamina into two parts; and a pair of fixed volumes for providing passive capacitances to fluid flow therethrough, said volumes connected to said base plate and in communication with said negative feedback resistors lamina forming a pair of series circuit impedances each comprising the two parts of a negative feedback resistor and one of said pair of volumes interposed therebetween to form a frequency-responsive lead-lag type fluidic component.

58. The laminated frequency-responsive fluidic component set forth in claim 55 wherein said additional laminae means comprise:

a fourth plurality of laminae superposed between said base plate and said supply pressure manifold section and comprising:

at least one lamina for separating each resistance in said negative feedback resistors lamina into two parts;

laminae means for reversing the polarity of the feedback signal to thereby also obtain a positive feedback signal;

at least one linear resistances lamina forming fluidic positive feedback resistors $R_f$;

at least one lamina for separating each resistance in said positive feedback resistors lamina into two parts;

and further comprising:

a first pair of fixed volumes for providing passive capacitances to fluid flow therethrough, said volumes connected to said base plate and in communication with said negative feedback resistors lamina forming a pair of series circuit impedances each comprising the two parts $\frac{R_f}{2}$ of a negative feedback resistor and one of said first pair of volumes $C_2$ where the natural time constant $\tau_2 = \frac{R_f C_2}{4}$ of the negative feedback circuit determines the second frequency response lead break of a fluidic notch component characterized by a first lag break, first and second lead breaks and a second lag break; and a second pair of fixed volumes connected to said base plate and in communication with said positive feedback resistors lamina forming a pair of series circuit impedances each comprising the two parts $\frac{R_f}{2}$ of a positive feedback resistor and one of said second pair of volumes $C_1$ interposed therebetween where the natural time constant $\tau_1 = \frac{R_f C_1}{4}$ of the positive feedback circuit determines the first frequency response lead break of the fluidic notch component.

59. A laminated fluidic component having no moving mechanical parts and characterized by compactness, low noise level, high signal-to-noise ratio and excellent frequency response and comprising:

a cover plate;

a base plate; and a plurality of laminae superposed between said cover and base plates, the combination of said plates and laminae retained in fluid-tight relationship, said plurality of laminae comprising a staged amplifier section and a supply pressure manifold section forming a fluidic gain block component;

said staged amplifier section comprising:

first laminae means having formed therethrough fluid flow passages defining parallel interconnected, separated, miniature size fluid amplifiers forming a high gain, high signal-to-noise ratio, multistage fluid amplifier component;

said supply pressure manifold section comprising:

second laminae means having formed therethrough a plurality of apertures equal in number to the number of staged amplifiers and overlapping channels for determining the fluid flow resistance to power fluid flowing therethrough and thereby determining different predetermined pressures of the power fluid supplied to the stages of fluid amplifiers;

said cover and base plates in combination provided with ports for supplying a control fluid input signal to the first stage fluid amplifier, for supplying power fluid to the last stage fluid amplifier, for supplying the fluidic gain block component output externally thereof and for venting the fluid amplifiers.

60. The laminated fluidic gain block component set forth in claim 59 and further comprising:

a second plurality of laminae superposed between said cover and base plates and comprising:

third laminae means having formed therethrough narrow channels for providing predetermined passive linear resistances to fluid flow therethrough to form fluidic input resistors $R_i$ and negative feedback resistors $R_f$; and fourth laminae means for isolating the input and feedback resistors and the gain block and for forming a part of the input and negative feedback circuits respectively including said input and feedback resistors to thereby form a fluidic operational amplifier component having a substantially fixed gain $\frac{\Delta P_o}{\Delta P_i} = \frac{R_f}{R_i}$ determined by the passive resistors, said first, second, third, and fourth laminae each being of small dimension approximately 1½ inch long, two-thirds inch wide and of thickness in the range 0.001 to 0.010 inch for a five-stage amplifier fluidic gain block component, the power nozzle width of each amplifier of approximately 0.010 inch or smaller, the small dimensions permitting very short internal fluid flow passages thereby minimizing undesirable time delays and obtaining improved frequency response compared to conventional larger size fluid amplifiers, the parallel interconnected, separated, miniature size fluid amplifiers structure obtaining improved signal-to-noise ratio and reduced noise level compared to conventional size fluid amplifiers, the multistage amplifiers supplied with the different predetermined pressures thereby obtaining a high forward gain G for the fluidic gain block component.

61. The laminated fluidic operational amplifier component set forth in claim 60 and further comprising a pair of fixed volumes for providing passive capacitances to fluid flow therethrough, said volumes in communication with the output of the last stage amplifier for preventing unstable operation of the operational amplifier component.

62. The laminated fluidic operational amplifier component set forth in claim 60 and further comprising a third plurality of laminae superposed between said base and cover plates, and fixed volumes, for providing selected fluidic impedances in the feedback circuits of said operational amplifier to thereby convert the operational amplifier to a particular frequency-responsive fluidic component.

63. The laminated frequency-responsive fluidic component set forth in claim 62 wherein said third plurality of laminae comprise:

fifth laminae means for reversing the polarity of the feedback signal to thereby also obtain a positive feedback signal;

sixth laminae means having formed therethrough narrow channels for providing predetermined passive linear resistances to form fluidic positive feedback resistors $R_f$; and seventh laminae means for separating each resistance in said sixth laminae means into two parts;

a first pair of fixed volumes for providing passive capacitances to fluid flow therethrough, said volumes in communication with the output of the last stage amplifier for preventing unstable operation of the component; and a second pair of fixed volumes in communication with said sixth laminae means forming a pair of series circuit impedances each comprising the two parts of a positive feedback resistor and one of said second pair of volumes interposed therebetween to form a fluidic integrator component providing the mathematical computation of integration over a relatively wide frequency range of control input signals.

64. The laminated frequency-responsive fluidic component set forth in claim 62 wherein said third plurality of laminae comprises:

eighth laminae means for separating each resistance in said third laminae means into two parts; and a pair of fixed volumes in communication with said third laminae means forming a pair of series circuit impedances each comprising the two parts of a negative feedback resistor and one of said pair of volumes interposed therebetween to form a frequency-responsive lead-lag type fluidic component.

65. The laminated frequency-responsive fluidic component set forth in claim 62 wherein said third plurality of laminae comprise:

ninth laminae means for separating each resistance in said third laminae means into two parts;

tenth laminae means for reversing the polarity of the feedback signal to thereby also obtain a positive feedback signal;

eleventh laminae means having formed therethrough narrow channels for providing passive linear resistances to form fluidic positive feedback resistors $R_f$; and twelfth laminae means for separating each resistance in said eleventh laminae means into two parts; and a first pair of fixed volumes for providing passive capacitances to fluid flow therethrough, said volumes in communication with said third laminae means forming a pair of series circuit impedances each comprising the two parts $\frac{R_f}{2}$ of a negative feedback resistor and one of said first pair of volumes $C_2$ where the natural time constant $\tau_2 = \frac{R_f C_2}{4}$ of the negative feedback circuit determines the second frequency response lead break of a fluidic notch component characterized by a first lag break, first and second lead breaks and a second lag break; and a second pair of fixed volumes in communication with said eleventh laminae means forming a pair of series circuit impedances each comprising the two parts $\frac{R_f}{2}$ of a positive feedback resistor and one of said second pair of volumes $C_1$ interposed therebetween where the natural time constant $\tau_1 = \frac{R_f C_1}{4}$ of the positive feedback circuit determines the first frequency response lead break of the fluidic notch component.

66. A fluidic resistor lamina adapted for use in a laminated fluidic component to provide passive linear resistance to fluid flow and comprising:

a lamina of relatively small dimensions constructed of a material nonreactive with a fluid to be utilized, and in fluid-tight relationship with other laminae superposed on both sides thereof which form the laminated fluidic component; and at least one pair of channels having equal dimensions formed through said lamina to provide a fluidic resistor lamina having precise and predetermined values of linear resistance to fluid flow through said channels.

67. The fluidic resistor lamina set forth in claim 66 and further comprising a plurality of apertures spaced from said pair of channels for providing fluid flow passages through said lamina in a direction perpendicular thereto for particular pressurized fluid signals in the laminated fluidic component.

68. The fluidic resistor lamina set forth in claim 66 wherein the relatively small dimensions of the lamina are approximately 1½ inch length, two-thirds inch width and a thickness in the range 0.001 to 0.010 inch for a five-stage amplifier fluidic component.

69. The fluidic resistor lamina set forth in claim 66 wherein said one pair of channels having dimensions of 1.25 inches length and 0.005 inch width to provide a resistance of 995 pound seconds per inch$^5$ for air as the fluid medium at a temperature of 70°F. for a lamina of 0.002 inch thickness.

70. The fluidic resistor lamina set forth in claim 69 wherein the ends of each of the extremely narrow channels are terminated in larger size apertures for providing negligible fluid flow resistance in a perpendicular direction through said fluidic resistor lamina for communication with adjacent superposed laminae of the laminated fluidic component.

71. The fluidic resistor lamina set forth in claim 66 wherein said at least one pair of channels comprise two pairs of channels each having equal dimensions.

72. The fluidic resistor lamina set forth in claim 66 wherein said at least one pair of channels comprise two pairs of channels, a first of said two pairs of channels having equal dimensions and the second pair of channels having equal dimensions different from said first pair to thereby provide different fluid flow resistances to two pressurized fluid signals passing through said channels.

73. The fluidic resistor lamina set forth in claim 66 wherein said at least one pair of channels comprise a first pair of single relatively wide equal dimension channels forming a first pair of fluid flow resistors and a second pair of three parallel relatively narrow equal dimension channels forming a second pair of fluid flow resistors.

74. The fluidic resistor lamina set forth in claim 66 wherein said at least one pair of channels comprise two pairs of three parallel relatively narrow equal dimension channels forming two pairs of resistors having equal resistances.

PO-1050
(5/69)

UNITED STATES PATENT OFFICE
CERTIFICATE OF CORRECTION

Patent No. 3,534,755  Dated October 20, 1970

Inventor(s) Thomas F. Urbanosky

It is certified that error appears in the above-identified patent and that said Letters Patent are hereby corrected as shown below:

In column 13, line 12, change the equation " $\frac{1}{1+}$ to - $\frac{1}{1+\tau s}$ -

In column 14, line 59, after "inch" add a superscript - 5 - of the same small size as in column 14, line 75

In column 17, line 8, change ".0005" to - .005 -

SIGNED AND
SEALED
MAR 9 1971

(SEAL)
Attest:

Edward M. Fletcher, Jr.
Attesting Officer

WILLIAM E. SCHUYLER, JR.,
Commissioner of Patents